United States Patent [19]

Tsutsumi

[11] Patent Number: 5,248,460
[45] Date of Patent: * Sep. 28, 1993

[54] PRESSURE-HOLDING CHAMBER TYPE INJECTION MOLDING PROCESS AND APPARATUS

[75] Inventor: Shigeru Tsutsumi, Yonezawa, Japan

[73] Assignee: Seiki Corporation, Tokyo, Japan

[*] Notice: The portion of the term of this patent subsequent to Jun. 15, 2010 has been disclaimed.

[21] Appl. No.: 688,627

[22] PCT Filed: Mar. 7, 1990

[86] PCT No.: PCT/JP90/00300

§ 371 Date: Aug. 1, 1991

§ 102(e) Date: Aug. 1, 1991

[87] PCT Pub. No.: WO91/05651

PCT Pub. Date: May 2, 1991

[30] Foreign Application Priority Data

Oct. 12, 1989 [WO] PCT Int'l Appl. ... PCT/JP89/01052

[51] Int. Cl.⁵ ............................................. B29C 45/57
[52] U.S. Cl. .................... 264/40.5; 264/328.1; 264/328.8; 425/562; 425/567
[58] Field of Search .................. 264/40.1, 40.5, 328.1, 264/328.8, 328.9, 328.13–328.17, 328.19; 425/145, 146, 149, 547, 549, 555, 557, 558, 562, 563, 567, 568, 569, 585, 586, 587

[56] References Cited

U.S. PATENT DOCUMENTS

| Re. 28,721 | 2/1976 | Farrell . |
| 2,505,540 | 4/1950 | Goldhard . |
| 3,800,027 | 3/1974 | Tsutsumi . |
| 4,150,088 | 4/1979 | Chang et al. . |
| 4,164,523 | 8/1979 | Hanning . |
| 4,212,627 | 7/1980 | Gellert . |
| 4,256,689 | 3/1981 | Gardner . |
| 4,330,258 | 5/1982 | Gellert . |
| 4,563,324 | 1/1986 | Kubat et al. . |
| 4,632,652 | 12/1986 | Farrell . |
| 4,722,6�67 | 2/1988 | Furl . |
| 4,784,819 | 11/1988 | Spurr . |
| 4,846,651 | 7/1989 | Matsuda et al. . |
| 4,976,900 | 12/1990 | Tsutsumi . |

FOREIGN PATENT DOCUMENTS

| 0204133 | 12/1986 | European Pat. Off. . |
| 1554789 | 1/1970 | Fed. Rep. of Germany . |
| 2027514 | 12/1970 | Fed. Rep. of Germany . |
| 1779120 | 1/1972 | Fed. Rep. of Germany . |
| 2125496 | 9/1972 | France . |
| 2620646 | 3/1989 | France . |
| 565746 | 1/1984 | Japan . |
| 58-65639 | 4/1984 | Japan . |
| 59-179324 | 10/1984 | Japan . |
| 888448 | 1/1962 | United Kingdom . |
| 1561589 | 2/1980 | United Kingdom . |
| 2116903 | 10/1983 | United Kingdom . |
| 2172240 | 9/1986 | United Kingdom . |
| 2209990 | 6/1989 | United Kingdom . |
| WOA9003879 | 4/1990 | World Int. Prop. O. . |

OTHER PUBLICATIONS

Product Pamphlet of Komatsu (related to U.S. Pat. No. 4,846,651).

Primary Examiner—Jill L. Heitbrink
Attorney, Agent, or Firm—Kenyon & Kenyon

[57] ABSTRACT

A system of injection-molding a super-precision product by an injection machine with a mold comprises conventional fundamental steps including a material plasticizing and metering step, an injection step and a material pressure-holding step, with additional features in that a nozzle passage, enlarged in volume, extending from a machine body to a cavity gate is interrupted midway therealong by a valve from communication with the interior of the body, after the injection step but while the pressure-holding step is being carried out. The pressure-holding step is carried out at least using the valve for exerting an internal pressure on a forward portion of the injected material separated due to the passage interruption, and compacted in a fixed closed space limited by the valve including a mold cavity, during which step a next plasticizing and metering step is commenced. An instantaneous remetering step is carried out such that the material in the fixed closed space is adjusted to a predetermined value in amount in every shot by regulating its internal pressure to a corresponding value with a possible excess part of the material being discharged out of the machine system.

47 Claims, 9 Drawing Sheets

PRESSURE-HOLDING CHAMBER TYPE INJECTION MOLDING PROCESS AND APPARATUS

DESCRIPTION

1. Technical Field

The present invention relates to an improved process and apparatus for injection molding of plastic materials, particularly preferable in injection molding of super-precision products, which requires an extremely reduced variation from an average weight in every shot.

2. Background Art

According to a prior art, an apparatus for injection molding of plastic material comprises an injection machine of a screw plunger type and a mold arrangement defining a mold cavity where a molded article is formed. The mold arrangement may be a single mold for a molded product or consist of a primary mold for a molded product and a cold runner mold for a runner. In place of the cold runner mold, the apparatus may be provided with a hot runner mold incorporated with a manifold between the single mold and the injection machine. A nozzle passage is formed between the mold arrangement and a body of the injection machine, by a nozzle, in the most simple one cavity case or a hot runner mold arrangement and the nozzle.

With such an apparatus, a conventional injection molding process comprises steps of:

having a plastic material, in every shot cycle, plasticized and metered while being heated within the machine body;

having the hot plasticized material injected under pressure for the mold cavity through the nozzle passage;

having the hot injected material held at least partially within the entire mold cavity under pressure while the mold arrangement is being cooled to thereby provide and freeze a molded article therein; and having the frozen molded article removed from the mold cavity after the mold arrangement is opened.

Among the important factors influencing the quality of a molded product, it has been recognized that the material pressure-holding step is one of the most critical steps. If this step is not carried out in a suitable manner, the molded products have undesired shrinkages due to short shot and/or flashes due to over-packing.

The time of the material pressure-holding step depends on the time needed for cooling a molded article in the mold cavity.

With a fixed mold cooling capability and a fixed volume of the mold cavity, a thinner molded article takes a shorter time than a thicker molded article to freeze it enough for removal from the mold cavity. In this connection, the thicker molded article requires more time in the material pressure-holding step, although the injecting step and the plasticizing and metering step each take the same time as for the thinner molded article.

According to the prior art, the material pressure-holding step is carried out using the injection machine with the plunger exerting an external holding pressure, subsequent to an injection pressure, on the injected material in a combination of the mold cavity and the nozzle passage against the mold cavity. The conventional technology involves an external holding pressure exerted by the injection machine being controlled to form a multi-stepped pressure, rather than a non-stepped pressure, which is stepped at predetermined strokes of the plunger.

Since a function and effect of the material pressure-holding has not yet been precisely known, although there are some theories which have been developed, there have been various attempts to improve the material pressure-holding step for a plasticized material which is viscid and elastic in the multi-stepped external pressure approach. In the conventional approach, as matter of course, there is a serious difficulty in controlling such a multi-stepped pressure stepped in an accurate manner at predetermined precise stroke positions, since a time between the neighboring steps of the pressure is very short on the order of 0.01 second and with a very short distance between the strokes at the neighboring pressure steps being on the order of 0.1 mm, while an inner diameter of a barrel of the injection machine body is very large relative to such a small stroke difference. Under these circumstances the multi-stepped pressure control cannot rely on a manual operation. Therefore, most of the recent injection machines for producing precise products, particularly small size articles, are equipped with an expensive computer incorporated with expensive electronic detectors for the controlled parameters. In connection with the above, such a computer is also used for controlling the plasticizing and metering step and the injection step. In the injection step, there is also adopted a multi-stepped injection method involving a multi-stepped injection speed in most of the cases.

Only after the material pressure-holding step in a shot cycle is completed, can the plasticizing and metering step be carried out for a next shot cycle. This is because the injection plunger of the machine per se is essentially engaged in said material pressure-holding step. This means that the plasticizing and metering step is allowed to take a time from the completion of the material pressure-holding step to the time when the mold arrangement is opened for removing a molded article. This time is relatively short in a shot cycle period of time, for example 4.6 sec. (34%) in the shot cycle of 14.50 sec., while the time of the material pressure-holding step takes 5.09 sec. (35%).

The shot cycle time (14.50 sec.) is a sum of the plasticizing and metering time (4.6 sec.), the material pressure-holding time (5.09 sec.) and the other steps (5.41 sec.)

There is, of course, a strong demand for a higher productivity of a precision article due to a shorter shot cycle time in the plastic injection molding industry. This demand, therefore, forces, in one way, the period of time of the material pressure-holding step to be shortened, while ensuring that the quality of molded precision article is still good. This causes not only the mold cooling capability to be improved but also the computer control of the multi-stepped holding pressure and injection pressure with the associated piston strokes to be improved with higher accuracy to harmonize with the improved mold cooling, with the result that the computer control per se is obliged to be a more sophisticated or complicated one with a higher cost incurred in computer equipment. At the present time, the following statement is by no means an exaggeration. The cost of the computer occupies a large part of the cost incurred in production of the injection machine with the result that recent machine production has become very expensive compared with the cost of the original simple injection machine used in the past, which was equipped with no computer and ran by a simple operation involving "a non-stepped pressure and a non-stepped injection speed." This naturally leads to a higher cost incurred in producing molded articles.

In the other ways, in order to reduce the production cost, various efforts to shorten the shot cycle time, of course, have been made in the industry. Such a shortened cycle time forces the time of the plasticizing and metering step to be shortened under the conventional circumstances. However, a serious problem is encountered in that shortening of the plasticizing and metering step requires an increase in the plasticizing rate or performance with an increased power supply, leading to an increased machine cost and operation cost.

Further, it should be noted that such an increased plasticizing capability of the injection machine causes the plastic material per se to be damaged by the screw plunger due to breakage of chains of a high resin polymer, while the polymeric material is being plasticized. This leads to deterioration of a molded article.

Still further, the increased plasticizing capability requires the material to be heated to a higher temperature. This leads to prolongation of the time required to cool the molded article in the mold, and thus the enhanced heating works against the attempt to shorten the shot cycle time. Due to this lower quality of the plasticized material and an enhanced heating, therefore, in combination, there is a certain limitation of enlarging the plasticizing capability, even if the increased cost incurred in production of such a higher performance injection machine is neglected.

Under the circumstances, the inventor recognizes that the improvement or development of the process and apparatus for injection molding of a plastic material in the conventional art is reaching or has reached the limit.

In this regard, the inventor recently invented improved processes to cope with the above-mentioned problems. The detailed are described in International Patent Application in English PCT/JP89/01052.

The most simple but advantageous one of the improved processes in practice is summarized as follows:

The process of injection molding uses an injection machine having a body provided with an injection plunger therein and a hollow extension therefrom including a nozzle and forming a nozzle passage and a mold arrangement defining a cavity. The mold arrangement is incorporated with the machine to communicate between the interior of the machine body and the mold cavity via the nozzle passage. The process comprising steps of:

having a plastic material, in every shot cycle, plasticized and metered while being heated within the machine body;

having the hot plasticized material injected under pressure for the mold cavity through the nozzle passage;

having the hot injected material held at least partially within the entire mold cavity under pressure while the mold arrangement is being cooled to thereby provide and freeze a molded article therein; and having the frozen molded article removed from the mold cavity after the mold arrangement is opened.

The nozzle passage is interrupted midway therealong from communication between the interior of the machine body and the mold cavity, after the injection step but while the material pressure-holding step is being carried out.

A hot runner mold forms a forward part of said nozzle passage. The material pressure-holding step is carried out: first using the injection machine per se operated with the injection plunger to exert a first holding pressure on the entire injected material; but second using a valve means for exerting a second holding pressure on a forward portion of the injected material separated due to the nozzle passage interruption. The nozzle passage interruption is effected upon said injection.

The first holding pressure is a non-stepped external static pressure executed by the injection plunger subsequent to a dynamic injecting pressure, and the second holding pressure is a non-stepped internal static pressure exerted by the forward material portion thereon compacted in a fixed closed space consisting of a combination of the mold cavity and a forward part of the nozzle passage forming a pressure holding chamber defined by the hollow extension and the valve means between the valve means and the gate.

The process comprises a step of sucking back the hot material remaining in said forward passage part due to expansion of volume thereof before the mold arrangement is opened for removing the molded article but while said nozzle passage interruption is maintained, to thereby release the hot material from the excessive packing.

A forward end of the hot material remaining in the nozzle passage following the molded article is frozen by cooling the mold. The frozen or cold forward material end is melted by instantaneous heat being temporarily applied using a conventional pointed heat-generating means after said sucking back step is completed but just before a next shot.

According to the process, upon the nozzle passage interruption, the plasticizing and metering step is carried out by the injection machine for a next shot or injection. In this connection, the plasticizing and metering step can be carried out at a relatively low rate at the longest over a relatively long period of time substantially equivalent to that from the time just after a first injection to the time when the mold arrangement is closed for a second injection. The time of the longest step is almost equivalent to a shot cycle period of time from the first injection to the second injection.

This use of the material pressure-holding chamber is one of the most advantageous features of the process, which can never be attained by the prior art in using conventional approach where the material pressure-holding step relies on the injection machine. The above advantageous feature enables the time of the plasticizing and metering step to be prolonged, for example, from 3.5 sec. to 8.5 sec., in a fixed shot cycle time of 14.59 with the effect that the injection machine can be designed to operate at a lower plasticizing rate, for example about 2/5 (3.5/8.5) of the conventional machine, a much smaller size machine which consumes less power can be employed, and also the L/D ratio of the screw plunger is allowed to be larger. Further, with an injection machine having a fixed plasticizing rate, the shot cycle time is considerably decreased, for example to an extent of about 65% (9.59/14.59) of the conventional one.

Another important advantage is attained by using the internal holding pressure, particularly at the second material pressure-holding substep, which is continuously and automatically decreased as a temperature of the material held in the entire mold cavity is decreased due to cooling of the mold arrangement, to thereby form a cold molded article.

With an appropriate initial internal pressure selected, the molded article is obtained with no local shrinkage and flashes, without using any control of the holding pressure.

Generally speaking, this means that a computer is no longer needed for controlling the holding pressure, since the second substep is a predominant part of the overall time of the material pressure-holding step. Further a computer is no longer needed for controlling the holding pressure at the first substep because the time of the first substep is very short, in other words, the present invention does not rely substantially on the injection machine for carrying out the material pressure-holding step.

Herein, the word "external pressure" indicates a pressure exerted on a material by an external means, while the word "internal pressure" indicates a pressure exerted on a material by itself. The external means exerting the external pressure is movable in a direction thereof against the material contained in a space closed thereby and changeable in volume due to its movement, while the material exerting the internal pressure is contained in a fixed closed space. In this connection, the external pressure is constant irrespective of material's temperature being changed by heating or cooling, while the internal pressure is varied as the temperature is changed.

The inventor has named the above mentioned forward nozzle passage part incorporated with the valve means, a "material pressure-holding chamber", and also named the process an "injection molding system incorporated with a material pressure-holding chamber", for convenience in identifying the process using the new approach different from the first mentioned conventional one.

The inventor did recognize the fact that the above process is very effective in producing a precision molded article which has a predetermined average weight with less variation in a long run than that of the first mentioned conventional art. However, in light of his experiments and practices in carrying out the process, the inventor has recognized that in a preferable mode of the process using the pressure-holding chamber is designed to have a volume to such an extent that the volume is substantially the same as that of the mold cavity, although the reason was indefinite.

DISCLOSURE OF THE INVENTION

An object of the present invention is to provide a process and apparatus for injection molding improved further along the above line so that a super-precision article can be injection-molded or an injection-molded article can be produced with a considerably reduced variation from an average in weight in every shot in a long run, using a simple or unsophisticated injection machine, substantially not relying on any computer control.

The present inventor has found, due to further research on the above-mentioned chamber system involving the pressure-holding chamber with the valve means, that the chamber system exerts an "equalizing effect" on the injected material along with some other important effects summarized as follows:

1. With a fixed internal spatial volume of the internal pressure-holding chamber, a negative effect on a weight variation of a molded article in a long run exerted by the injection plunger exerting an external pressure on a plasticized and metered material against the mold cavity using the hydraulic power source, is minimized due to the nozzle passage interruption or the chamber being closed off from the machine body, while the nozzle passage interruption results in an advantage of increased shot cycle rate or productivity, as a next shot operation can be commenced upon the interruption.

2. With a variable internal spatial volume of the chamber, a further positive effect on the weight variation is exerted due to an "equalizing effect" on the injected material being increased as the volume of the chamber is increased relative to a volume of the mold cavity. A negative effect on a quality of the molded article is exerted increasingly as the volume of the chamber is increased, due to an increased period time of heating the material to be molded. A sucking-back operation involving enlargement and reduction of the chamber volume by axial movement of the nozzle forming a part of the chamber affects the equalization on the injected material in the chamber. This negative effect is enhanced as a ratio of additional volume of the chamber enlargement to the entire original chamber volume is increased.

3. With a predetermined or optimum internal spatial volume of the chamber, a critical positive effect on the weight variation is further exerted due to the metered and injected material being instantaneously remetered by regulating an internal pressure of the material at the chamber to a predetermined lower value upon the nozzle passage interruption with a possible excess part of the material being discharged out of the machine system.

4. According to the pressure-holding chamber system, a ratio (N) of the chamber volume to the cavity volume is critical in the equalizing effect. The equalization is effected such that every variation ($\Delta W$) from an average ($\overline{W}$ in weight of a molded article) in a long shot run is at a level of an average of assumed weight variations of the latest (n+2) shots without any pressure-holding chamber (N=0) being provided.

According to a theory of the equalization, $$\tfrac{3}{4}\,\overline{\Delta W_N} < \Delta W < \overline{\Delta W_N}$$

where: $\overline{\Delta W_N} = \dfrac{1}{N+2} \sum_{x=1}^{N+2} \Delta W_X$

5. The first external pressure-holding step terminates due to the chamber closing and thus the second internal pressure-holding step commences at a pressure (P), which value is determined to be constant for a predetermined average weight of a molded article, irrespective of the chamber volume ratio (N). However, the second internal pressure-holding step terminates and thus the such-back step commences at a pressure in the following relation with the chamber volume ratio (N):

$$\Delta P_{ON} = P_{ON} - P_{O1} = \left(\dfrac{N-1}{N}\right)\Delta P_1$$

$$\Delta P_N = P_N - P_{ON} = \dfrac{1}{N}\Delta P_1$$

$$P = P_1 = P_N$$

where:

$P_{ON}$ is a final internal pressure in the closed chamber having a volume N times cavity volume just before the sucking-back operation; and $P = P_N$ is a final external pressure in the opened chamber when the chamber is closed, or an initial internal pressure in the closed chamber when the chamber is closed. ($P = P_1 = P_2 \ldots = P_n$)

6. The remetering system (item 3) enables the external pressure-holding step, with a pressure reduced from an injection pressure, to be omitted to reduce a shot cycle rate and also attain a considerably lower weight variation of a molded article.

In this connection, according to the present invention, there is provided, in one aspect, an apparatus for carrying out the above mentioned pressure-holding chamber type injection molding, improved in that the above-mentioned injection machine is designed to have an internal spatial volume of the pressure-holding chamber being large enough relative to that of the mold cavity to exert an equalizing effect on the injected material so that a molded article has an average weight with reduced variation compared with an assumed corresponding article molded without effecting the nozzle passage interruption in a long run, but is small enough to prevent the hot material accumulated in the chamber from being damaged due to continued heating while remaining in the chamber. Preferably, a ratio (N) of the chamber volume to the cavity volume is approximately that of said mold cavity or greater.

The apparatus has a sucking-back arrangement, wherein the hollow extension is divided into forward and rear parts. The rear part forms the nozzle at a forward end thereof and is provided with the valve means upstream of the nozzle. The injection machine is provided with a means for having the machine body with the rear part connected thereto move axially relative to the forward part. The forward part has a rear cylinder section and a forward section connected to the hot runner mold. The nozzle forms a bore piston section axially movably disposed in the rear cylinder section. The bore piston section and the cylinder section in combination form means for axially abutting them against each other to stop an axial forward movement of the nozzle at a fixed relative position and to prevent leakage of the material at the nozzle, by a sealing action resulting from the abutment. A combination of the cylinder section and the bored piston section causes the nozzle passage to axially expand the volume thereof by a rearward movement of the injection machine relative to the mold arrangement, while the nozzle passage interruption is maintained but before the mold article is removed from the mold cavity, with the effect that the hot material remaining in the closed space is sucked back so that it is released from being pressurized and compacted.

To enable the chamber volume ratio (N) to be adjusted to desired levels relative to various kinds of cavities having various volumes, respectively, the axially abutting and sealing means comprises a stopper provided at the bore piston section or the nozzle for allowing an axial position of the stopper relative to the machine body to change in cooperation with the rear part of the hollow extension to thereby have the volume of the pressure-holding chamber ,adjusted to a desired level. The nozzle is provided so as to be stationary relative to the machine body, and the stopper is comprised of an internally threaded ring member, while the nozzle is partially threaded externally. The nozzle is engaged with the ring stopper by being screwed thereinto.

Alternatively, the stopper is fixed to the nozzle, while the rear hollow extension part is divided into a rear local part which is partially threaded internally, and the nozzle forming a forward local part which is partially externally threaded. The nozzle is engaged with the rear local part by being screwed thereinto.

In another aspect, the present invention provides a process of injection molding a super-precision article using the above-mentioned apparatus. The process is characterized in that the hot material compacted in the fixed closed space in each shot is adjusted to a predetermined value in amount before termination of the second internal pressure-holding step by discharging an possible excess part of the compacted material out of the machine system.

According to the present invention, the above mentioned adjustment of the hot material compacted in the fixed closed space is effected by an additional metering or remetering (relative to the metering before the injection) step. The remetering step is carried out upon the nozzle passage interruption, by regulating the internal pressure of the compacted hot material to a predetermined value, if the internal pressure is over that value, with a part of the compacted hot material being discharged out of the injection machine system, with the effect that plastic products are molded by the injection machine system with said mold cavity, so that the products have an average weight corresponding to a level substantially equivalent to or somewhat lower than the predetermined value of the pressure in a long run under fixed operational conditions.

Preferably, the injecting step is carried out under non-stepped operational conditions to fill the mold cavity with the material with the plunger exerting a non-stepped external pressure thereon. The injecting external pressure and the material holding external pressure in combination form a stepped external pressure exerted by the injection plunger under stepped operational conditions. The above pressure regulation is effected using a combination of a local passage leading to the exterior of the injection machine system and provided to form a branch from the nozzle passage at the valve means for discharging the part of the compacted material therethrough, and an additional valve means incorporated into the local passage and provided for: opening the local passage to the nozzle passage upon the nozzle passage interruption; opening the local passage to the exterior when the internal pressure is over the value; and closing the local passage off from the exterior when the internal pressure is reduced to the predetermined value.

According to another aspect of the present invention, the above mentioned remetering system of the present invention may be used to omit the above mentioned first external pressure-holding step such that the material pressure-holding step consists of the (second) internal pressure-holding step switched from the injection step by the nozzle passage interruption. In this case, the remetering system is operated to have a final injection pressure equivalent to an initial internal pressure stepped down to a lower internal holding pressure which is of the above mentioned predetermined value upon the nozzle passage interruption. Such omission of the first external pressure-holding step is advantageous in not only reducing a weight variation of a molded article but also shortening a shot period of time by, at the maximum, the time of the first external pressure-holding step with the effect that a higher productivity is attained.

According to the present invention, the plastic "material" referred to herein covers not only a pure plastic resin material but also a mixture of the pure resin material and some other material such as metallic or non-metallic particles or fiber.

BRIEF DESCRIPTION OF DRAWINGS

FIG. 3A is an enlarged partial view of the remetering means of FIG. 1 where a piston of a remetering device is indicated in a closed position on the left and an opened position on the right relative to the piston axis, respectively;

FIG. 4A is an enlarged partial view of the first embodied remetering means;

BEST MODE FOR CARRYING OUT THE INVENTION

Figure 1:
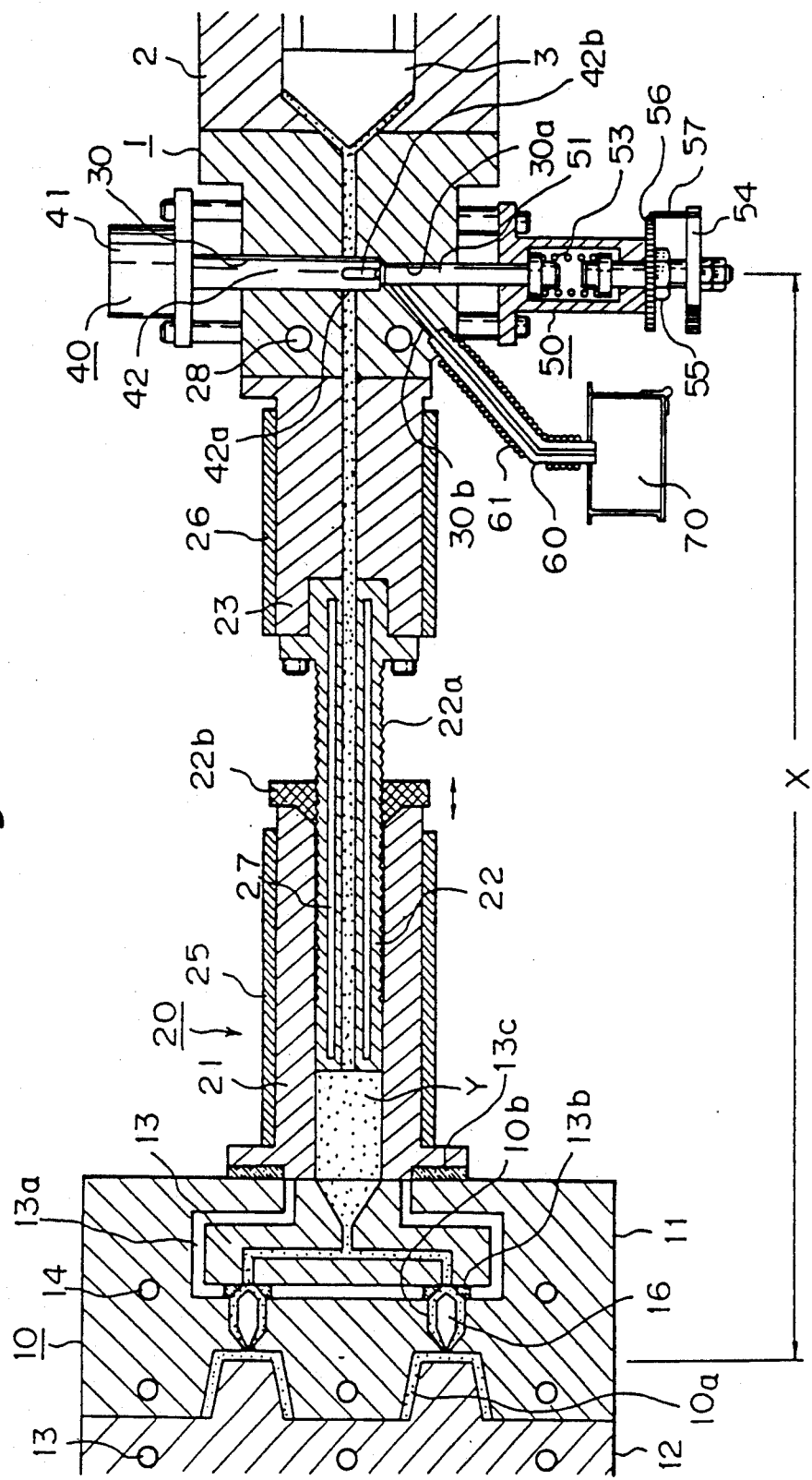
FIGS. 1 and 2 are partial cross-sectional views showing two embodiments of a pressure-holding chamber type apparatus for injection molding of plastic material having a mold arrangement, involving a first embodied remetering means provided in the apparatus.
Figure 2:
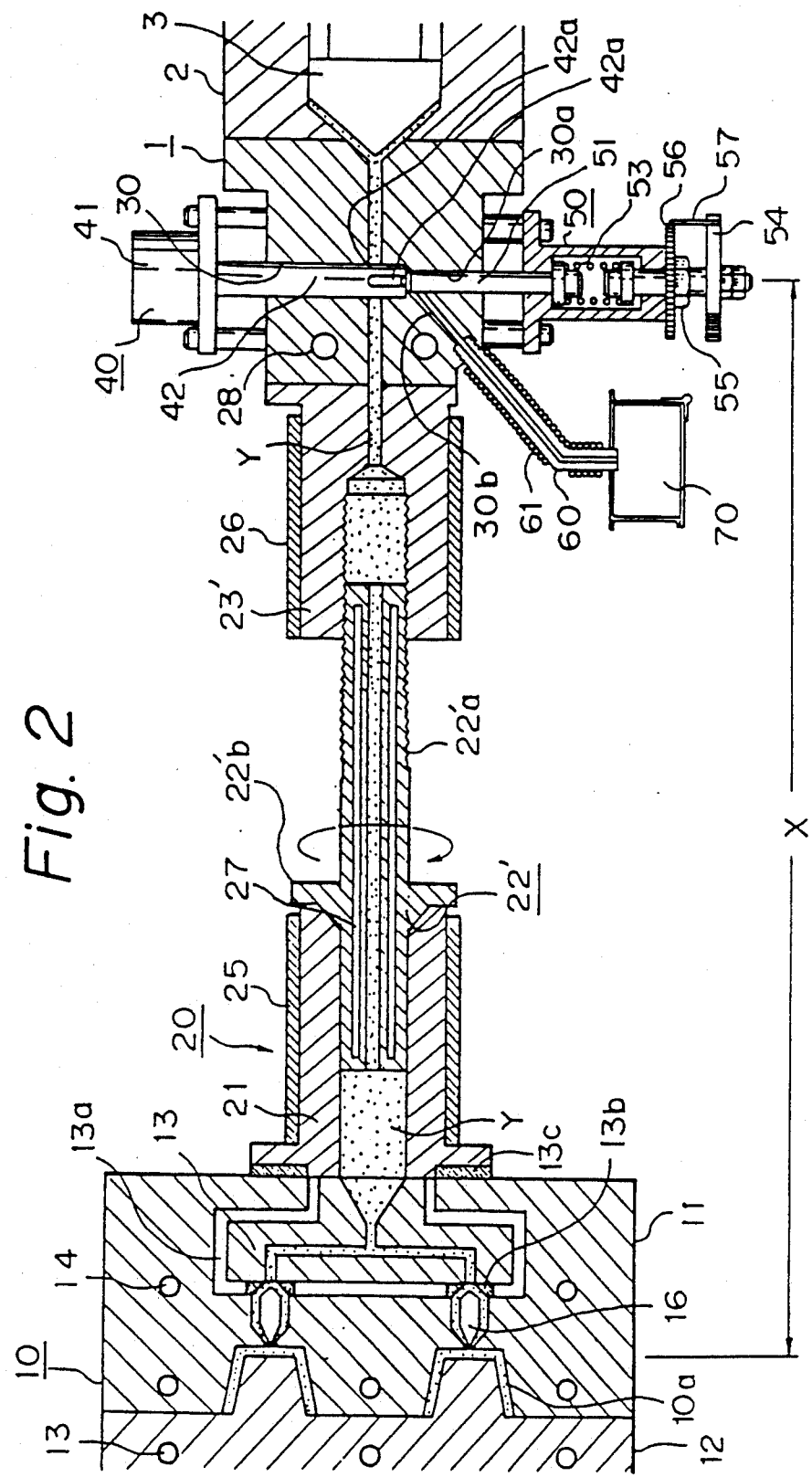

FIGS. 1 and 2 show first and second embodiments of apparatuses according to the present invention. Referring to FIGS. 1 and 2, each apparatus for injection molding of plastic material has a conventional single barrel type injection machine 1 and a mold arrangement 10 incorporated therewith. The machine 1 is axially movable for a suck-back operation and an injection operation, and comprises a body 2 forming a barrel 2 having a screw plunger 3 therein, a hydraulic piston-cylinder with a piston connected to the plunger 3, and a cylindrical extension 20 extending forwardly from the barrel 2. The apparatus further comprises a hot runner mold 12 incorporated with a manifold. The hot runner mold 12 is incorporated in the mold arrangement 10 in a thermal-insulating manner involving an air spacer 13a and solid spacer 13b.

The cylindrical extension 20 is in direct contact with the hot runner mold 13 at its forward end, but is connected with the mold arrangement 10 at its forward end via a solid thermal insulator 13c.

The mold arrangement 10 comprises a stationary mold half 11 and a movable mold half 12. The stationary mold half 11 is connected to the hot runner mold 13. Both mold halves have cooling means 14 and 15, and define at least one cavity 10a for a molded article, which cavity has at least one gate 10b. The gate 10b has a pointed heat-generating module 16, such as a so called "spear", received therein to thereby have the module heat a cold part of the material at the gate temporarily and instantaneously with the effect that the gate is opened to the cavity for a next shot, after the suck-back step is completed.

The hot runner mold 13 and the module 16 incorporated therewith result in a runnerless article being molded.

The cylindrical extension 20 is divided into three parts, that is, a forward part 21 connected to the hot runner mold 12, an intermediate piston part 22 (22') axially disposed in the forward part, and a rear part 23 (23'). The intermediate part 22 (22') is provided with internal heat pipes 27 therein, while the forward and rear parts 21 and 23 (23') are provided with band heaters 25 and 26, respectively.

The hot runner mold 12 and the cylindrical extension of the machine 1 in combination form a hollow extension defining a nozzle passage Y communicating the interior of the barrel 2 with the cavity gate 10b.

The rear cylindrical extension part 23 (23') is incorporated with a valve means 40 at its rear section having a heating means 27. The nozzle passage Y forms an internal pressure-holding chamber X between the valve means 40 and the cavity gate 10a.

The intermediate piston part 22 (22') of the cylindrical extension 20 is referred to herein as a "nozzle", and the nozzle consists of a cylindrical body 22a and a circumferential flange 22b (22'b) provided to work as a stopper against the forward part 21 at an abutting end face thereof, and also as a sealing means for preventing leakage of the hot material when the material is injected. An axial position of the nozzle 22 (22') relative to the forward part 21 is fixed when the flange 22b (22'b) abuts against the abutting end face of the forward part 21. The machine 1 with the nozzle 22 (22') is sucked back by a predetermined stroke from the above position.

According to the first embodiment with reference to FIG. 1, the nozzle 22 is connected to a forward section of the rear part 23 having the band heater 26. The nozzle body 22a and flange 22b are separate pieces. The nozzle body 22a is partially threaded externally at its outer circumferential surface. The flange 22b has an axial through-hole which is internally threaded so that it is screwed on the nozzle body 22a with the effect that its axial position can be changed relative to the nozzle body 22a or the rear cylindrical part 23. The nozzle body 22a has a non-threaded forward portion, and is tightly fitted to but is axially slidable in forward part 21.

With the above arrangement involving the three parts 21, 22 and 23 of the cylindrical extension 20, the pressure-holding chamber X has an internal spatial volume changeable due to rotation of the nozzle flange 22b relative to the nozzle body 22a. In this case, the machine 1 per se has to be axially shifted by a corresponding stroke. That is, a ratio N of the chamber X to the entire cavity volume can be changed to a desired value.

According to the second embodiment of the present invention with reference to FIG. 2, the nozzle body 22'a is integrated with the flange 22'b, and it has an outer surface divided into forward an rear portions by the integrated flange 22'b. The rear surface portion of the nozzle 22' is externally threaded. A forward section of the rear cylinder part 23' having the band heater 26 is internally threaded so that it can be screwed on the nozzle 22'. In this connection, an internal spatial volume of the chamber X or the chamber volume ratio N is changeable due to rotation of the nozzle 22' per se. In this case, the machine 1 per se has to be axially shifted by a corresponding stroke.

Referring to FIGS. 1 and 2, the valve means 40 comprises a pulse motor 41 mounted on the rear section of the rear cylindrical part, and a circular valve rod 42 extending vertically from the motor 41. The rear section has a vertically circular hole 30 crossing the nozzle passage Y. The valve rod 42 is rotatably disposed in the vertical hole 30, and has a horizontal through-hole 42a. The hole 42a forms a portion of the nozzle passage Y when the valve means 40 or the valve rod 42 is in an opened position. The valve rod 42 effects a nozzle passage interruption or a chamber closing against communication of the barrel 2 with the cavity 10a in a closed position.

The apparatus has a remetering means incorporated with the chamber X.

Referring to FIGS. 1 and 2, an embodiment of he remetering means according to the present invention has first and second valve means. The first valve means comprises the valve rod 42 provided with a groove 42b formed at a surface portion thereof and extending vertically from a level of the nozzle passage Y to a lower free end of the valve rod. The vertical groove 42b is angled by 90° relative to the through-hole 42a of the valve rod 42. The groove 42b and the vertical hole 30 of the rear cylindrical part 23 (23') in combination form a vertical local passage open to the chamber X and communicating with the interior thereof, when the valve rod 42 is in the closed position.

The vertical through-hole 30 is constricted at a vertical position below the nozzle passage to form a smaller diameter hole portion 30a communicating with the vertical groove 42b. The smaller diameter hole 30a has an outlet passage 32b formed to open at a vertical position in the vicinity of the lower free end of the valve rod 42.

There is provided a piston-cylinder 50 incorporated with a coil spring 53 therein for urging a piston 51 disposed in the smaller diameter hole portion 30a and slidably fitted to an inner wall thereof against the material in the chamber X when the machine 1 is operated. The smaller diameter hole portion 30a with the outlet passage 30b and the piston-cylinder with the coil spring 53 forms the second valve means. The second valve means is respectively closed and opened when the material in the chamber X has a pressure less than a predetermined value, and over the predetermined value. The first valve means is closed and opened when the valve rod 42 is in the opened and closed positions, respectively.

A handle 54 having an indicating pin 56 and a bolt-nut arrangement 55 incorporated with the coil spring 53 received in the cylinder 50 are provided to regulate a strength of the coil spring 53. By rotation of the handle 54, the above pressure value is changed to a desired one which is indicated on a disc type scale 56 by the indicating pin 57.

The outlet passage 32b communicates with a discharge conduit 60 provided with a heating means 61. The conduit 60 is open to a tank 70.

In this connection, a part of the material in the chamber X is discharged, upon the nozzle passage interruption following the injection, through the groove 42b, the outlet passage 32b and the conduit 60 into the tank 70, when a pressure of the material in the closed chamber X is over the predetermined value, with the effect that the pressure of the material in the closed chamber X is equalized to the predetermined value. That is the material, which was once metered in the barrel 2 with the screw plunger 3, injected and accumulated in the closed chamber X, is remetered to a predetermined amount corresponding to the predetermined pressure, while a possible excess part of the material is discharged out of the machine system upon the nozzle passage interruption or the chamber closing due to the valve means 40.

Figure 3:
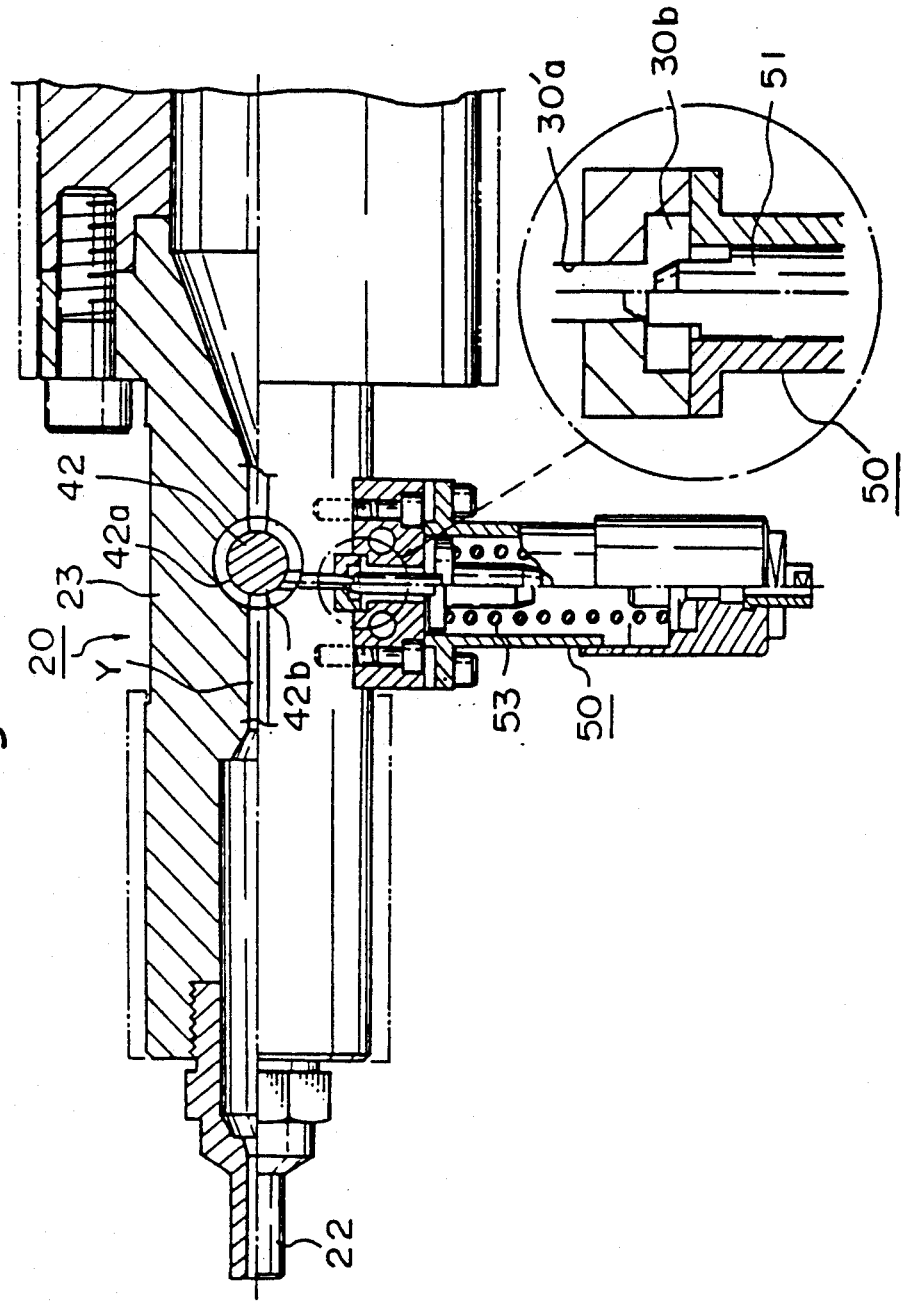
FIG. 3 is a partial cross-sectional view showing another embodiment of the apparatus involving a second embodied remetering means.

FIG. 3 is another embodiment of the remetering means according to the present invention, incorporated in an apparatus corresponding to those of FIGS. 1 and 2.

Referring to FIG. 3, a corresponding valve rod 42 has a corresponding through-hole 42'a and groove 42'b. The groove 42'b is formed to extend horizontally or in parallel to the valve rod hole 42a. A corresponding cylindrical rear part 23 has a horizontal outlet hole 30'a open to a corresponding vertical hole 30'. The outlet hole 30'a correspond to the vertical smaller diameter hole portion 30a in FIGS. 1 and 2. A corresponding piston-cylinder has a coil spring 53 and a piston 51. The piston 51 is not allowed to move into the outlet hole 30'a, but the piston 51' abuts at its conical free end portion against a circumferential shoulder or edge of a lower end of the outlet when it is in a closed position. The outlet is open to a corresponding outlet passage 32'b at the lower end thereof.

The horizontal groove 42'b, the horizontal hole 42'a and the horizontal outlet hole 30'a are designed such that the outlet hole 30'a communicates with the horizontal groove 42'b when the valve rod 40 is in a closed position, and is interrupted from the communication when the valve rod 40 is in an opened position where the horizontal hole of the valve rod 40 forms a part of the nozzle passage. Compared with the first embodiment of the remetering means, the second embodiment as shown in FIG. 3 is advantageous in that a stroke of the piston 51' between the opened position and the closed position of the second valve means is reduced.

Figure 4:
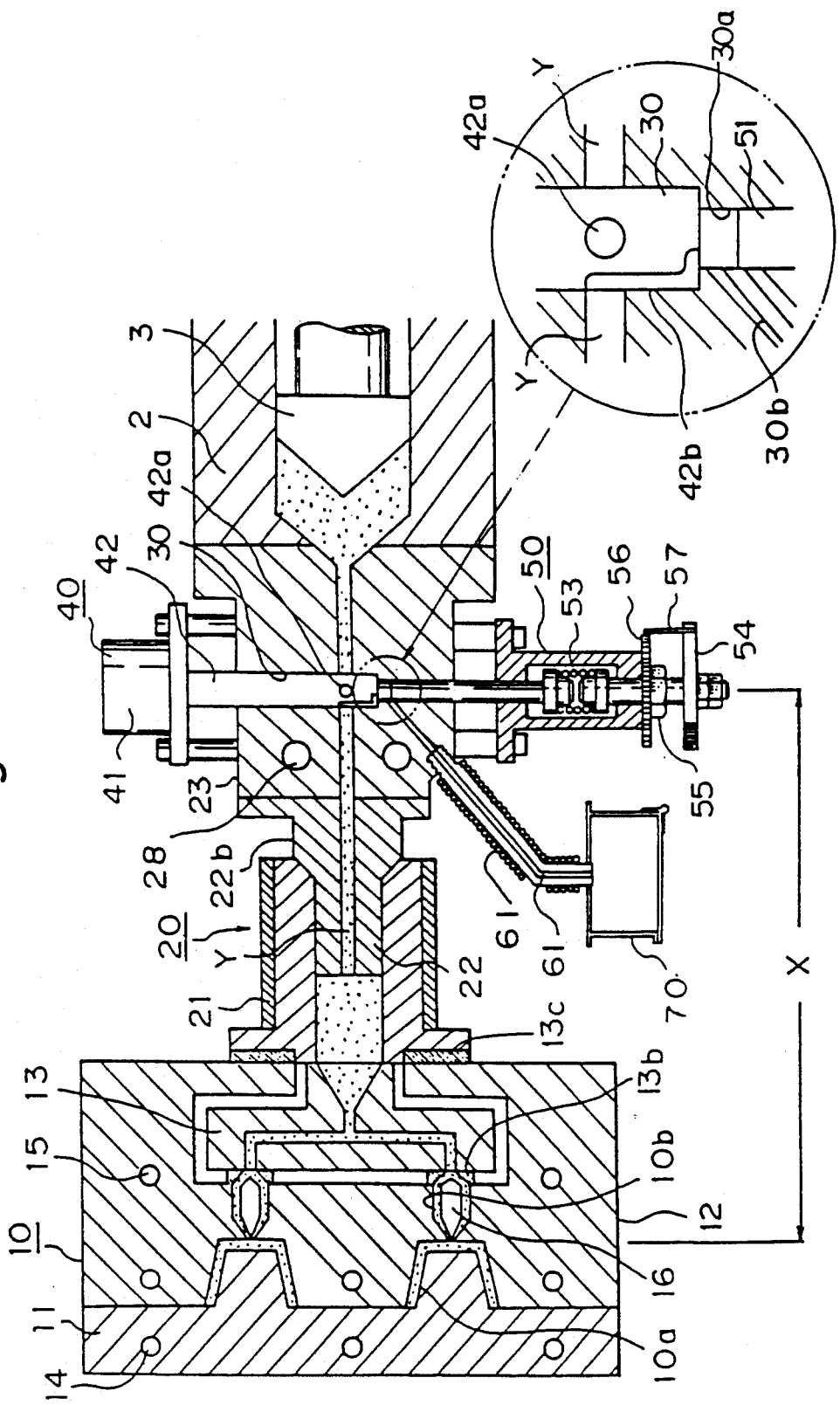
FIG. 4 is a partial cross-sectional and plane view showing a fourth embodiment of the apparatus but involving the first embodied remetering means.

FIG. 4 shows a third embodiment of the apparatus according to the present invention. Referring to FIG. 4, the apparatus is the same as those of FIGS. 1 and 2 except for a corresponding chamber X having a fixed internal spatial volume but with the same remetering means.

According to the present invention, a process of injection molding comprises a conventional plasticizing and metering step, a pressure-holding step, and a conventional suck-back step.

According to an embodiment of the present invention, using a pressure-holding chamber type injection machine incorporated with a mold arrangement as shown in FIG. 1, 2, 3, or 4 but with no remetering means comprising the piston-cylinder 50 being provided or being in operation, the pressure-holding step consists of an external pressure-holding step carried out by the injection plunger 3 and an internal pressure-holding step carried out due to the nozzle passage interruption or the pressure-holding chamber closing. Upon the nozzle passage interruption, a next shot operation is commenced, while the present shot operation continues. The continuing shot operation involves the suck-back step, a continuing cooling step for a mold article in the cavity 10a, and removal of the article from the mold arrangement 10 due to opening of the mold halves 11 and 12.

The second pressure-holding step is carried out due to the nozzle passage Y being interrupted by the valve means 40 from communication of the barrel 2 with the cavity 10a. The nozzle passage interruption or the chamber closing results in providing a closed space consisting of the closed chamber X and the cavity communicating therewith through the gate 10b. In the closed space, a part of the entire material injected once or a plurality of times is compacted to exert an internal pressure against the cavity wall so that the internal pressure-holding is effected.

The internal pressure-holding per se is advantageous in that a negative influence due to the injection plunger 3 operated by the hydraulic piston-cylinder on the weight variation of a mold article is prevented from continuing upon the nozzle passage interruption. In turn, if the negative influence due to the injection plunger 3 continues until a part of the material at the gate 10b is frozen with the effect that the hot remaining part of the material in the closed chamber is separated from the material compacted in the cavity 10b, the variation ($\Delta W$) of the article weight from an average thereof becomes maximum.

Further, if the chamber is provided with a hydraulic piston-cylinder device for exerting an external pressure on the material compacted in the closed space consisting of the chamber and the cavity, the hydraulic piston-cylinder device per se negatively influences the material to be molded in the cavity like when used for exerting the overall external holding pressure. Therefore, in this assumed case, the nozzle passage interruption by the valve means is of no merit for reduction of the weight variation, although it is still advantageous in increasing productivity or a shot cycle rate.

Further, the internal pressure-holding with a chamber X having a volume ratio of N is advantageous in that it exerts an equalizing effect on the injected material such that a weight variation ($\Delta W$) of a molded article in every shot is reduced to a level of a weight average of the latest N+2 shots, i.e., a level of $$\frac{1}{N+2} \sum_{x=1}^{N+2} \Delta W_x$$

in an assumed run with no chamber (N=0). In practice, a chamber X having a ratio of N<1 does not exert a distinctive equalizing effect compared with that of N≧1.

Figure 5:
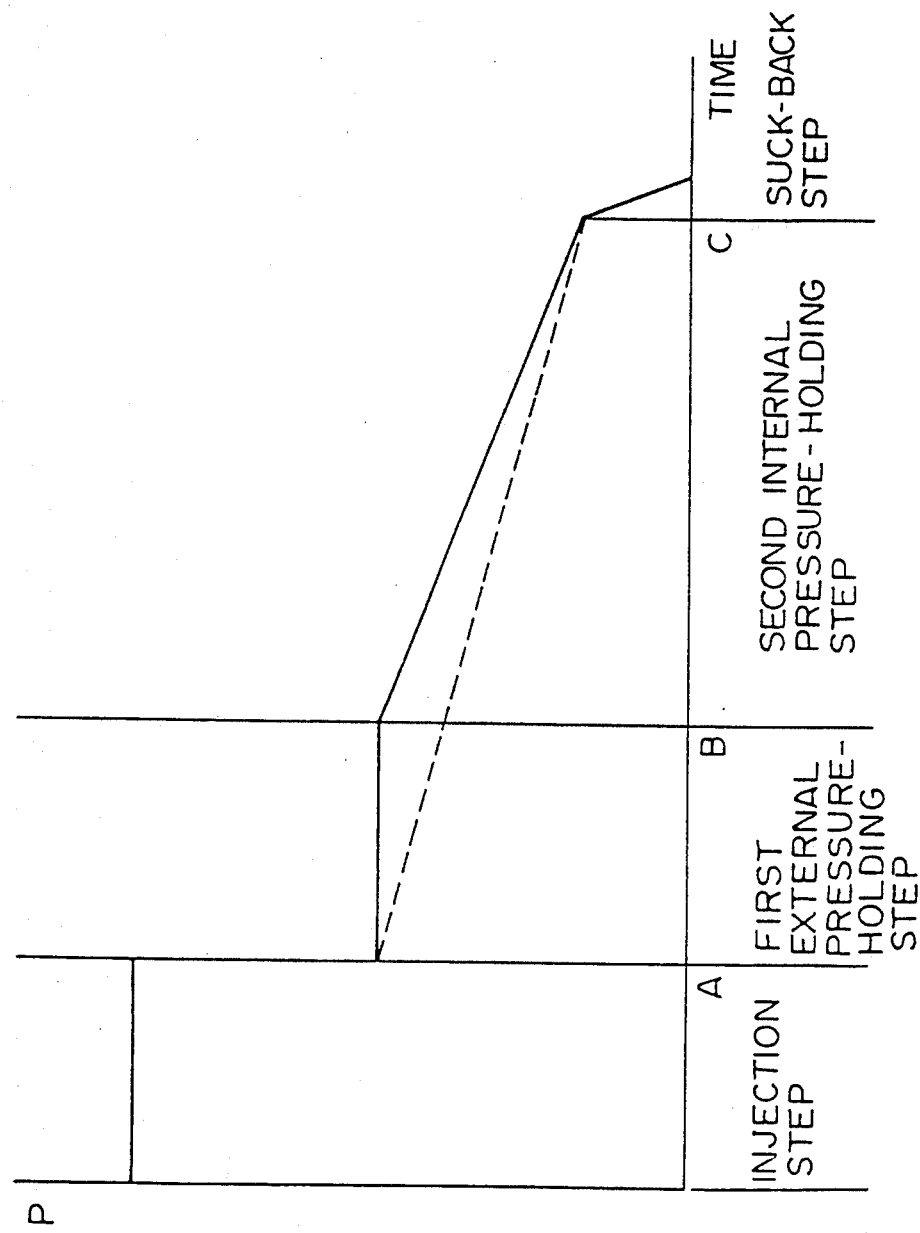
FIG. 5 is a qualitative diagram showing an external injection pressure, an external holding pressure and an internal holding pressure applied in a process of injection molding according to the present invention.

A preferable pressure mode of the injection and the first and second pressure-holding steps is indicated in FIG. 5, where the pressures involved are indicated in a qualitative manner.

The preferable pressures in both injection and first external pressure-holding steps are non-stepped pressures, and, in combination, form a stepped pressure. According to one experiment where the chamber volume ratio is 1, these pressures can be indicated as in FIG. 6 in a practical or real manner.

Figure 7:
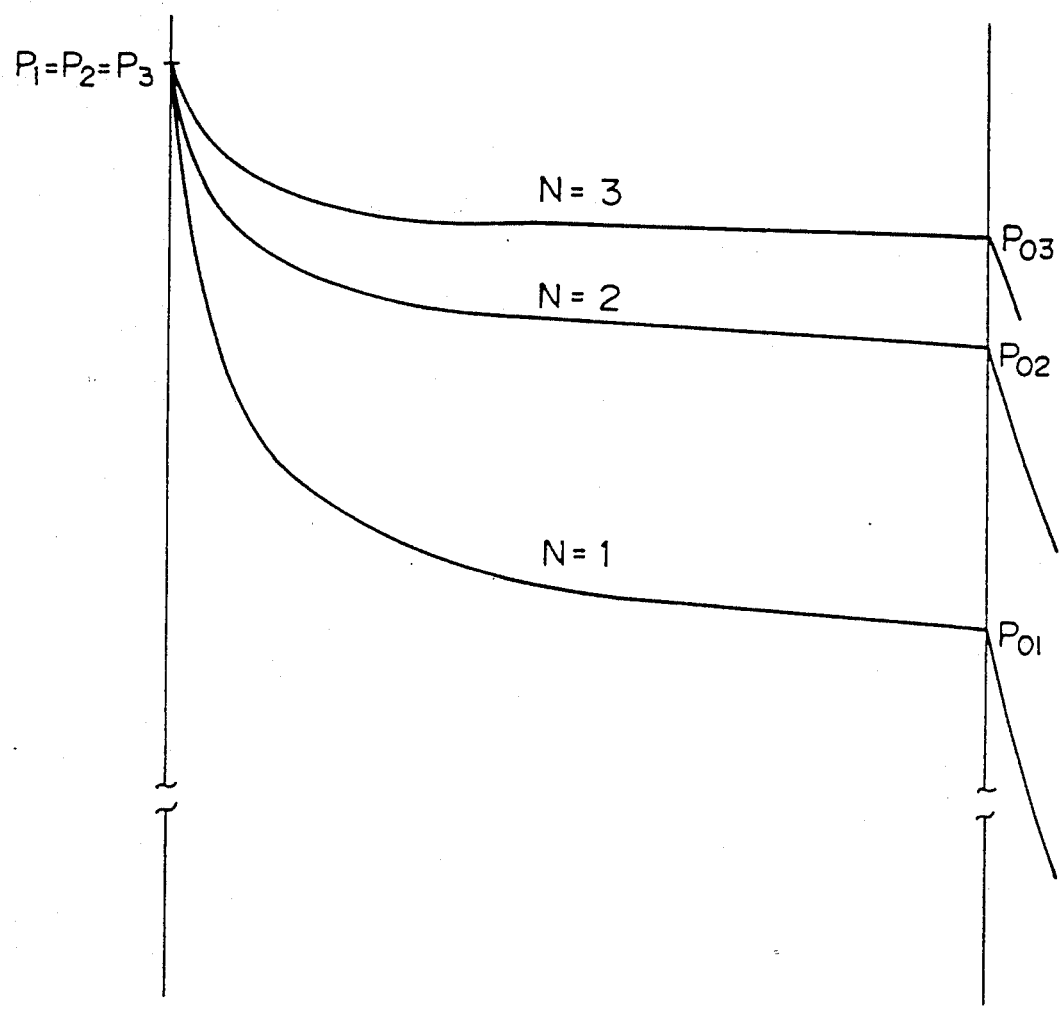
FIG. 7 is a practical diagram showing internal holding pressure profiles in the pressure-holding chamber, which vary depending on a chamber volume ratio N relative to a cavity volume.

The internal pressure in the second pressure-holding step is varied as the chamber volume ratio N is changed as shown in FIG. 7. In FIG. 7, $P_1$, $P_2$, $P_3$ and $P_N$ are the same value, and represent initial pressure of the material compacted in the pressure-holding chamber X exerted when the nozzle passage interruption is effected, in other words, they represent the final pressure of the material in the chamber X exerted by the injection plunger in the first external pressure-holding step, in cases where the chamber volume ratio N is 1, 2, 3 and $P_N$, respectively.

Figure 6:
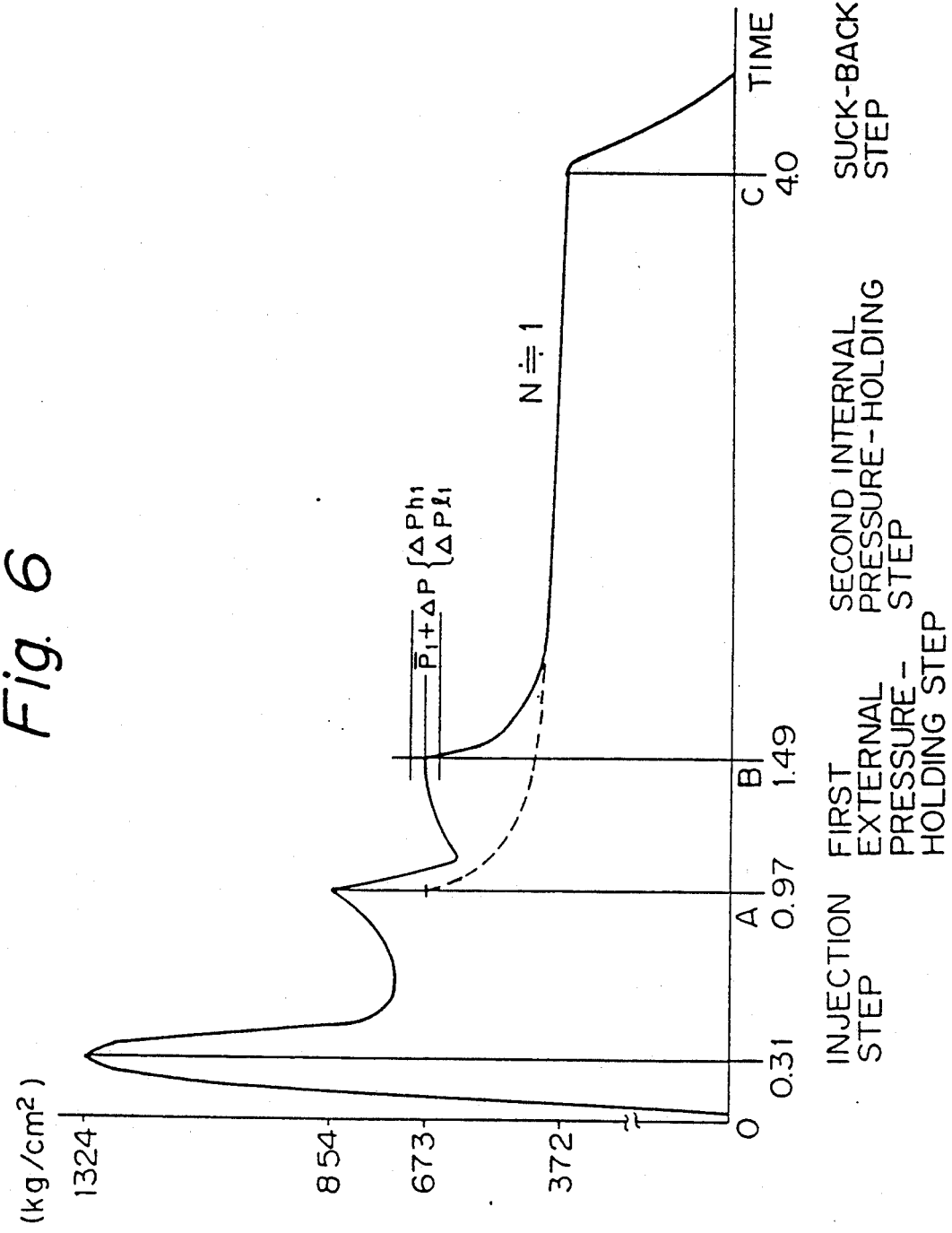
FIG. 6 is a practical diagram showing the above-mentioned three pressures profiles.

Referring to FIG. 6, the initial internal pressure $P_1$ (where N=1) has an average $\bar{P}_1$ with a variation $\Delta P_1$ ranging from an upper value $\Delta P_{h1}$ to $\Delta P_{l1}$. In general, $\Delta P_N$ is decreased as N is increased.

The first external pressure-holding step is carried out in order to switch a high injection external pressure to a lower external pressure for pressure-holding. However, it is preferable to shorten the first external pressure-holding step in time such that the first pressure-holding step terminates upon the reduced external pressure being substantially stationary, and is switched to the second internal pressure-holding step by the nozzle passage interruption, as shown in FIG. 6. This is to minimize the negative influence due to the injection plunger operated by the hydraulic piston-cylinder.

Preferably, the process of the present invention may comprise further an instantaneous remetering step for regulating the internal pressure to a predetermined value $P_r$, while a possible excess part of the material is discharged out of the machine system using the remetering means as shown in FIGS. 1, 2, 3 and 4.

According to one of embodiments of the present invention using an apparatus as shown in FIG. 1, 2, 3, or 4, involving the remetering means, a process involving the first external pressure-holding step, the second internal pressure-holding step and the instantaneous remetering step is carried out along the following line.

An initial internal holding pressure P, equivalent to a final external holding pressure exerted when the nozzle passage interruption occurs, is stepped down to a predetermined lower value $P_r$ by the instantaneous remetering step.

In a long run in practice, the predetermined value $P_r$ is determined to be equivalent to an average value ($\bar{P}$) of initial internal pressures (P) exerted in the closed chamber in an assumed or test long run with the injection machine system under desired operational conditions but with the local passage being closed off from the exterior in every shot. The assumed initial internal pressures P, which is also an assumed final external holding pressure, varies in a range between a lower limit $P_l$ and a higher limit $P_h$. Further, some of the operational conditions are changed to thereby have a practical initial internal pressure P' in the second pressure-holding step substantially vary with an average value $\bar{P}'$ equivalent to $P_h$ or higher, between an upper limit ($\bar{P}' + \Delta P'_h$) and a lower limit ($\bar{P}' - \Delta P'_l$) equivalent to $\bar{P}$ or higher, while the other operational conditions substantially remain as they are in the assumed run.

Figure 8:
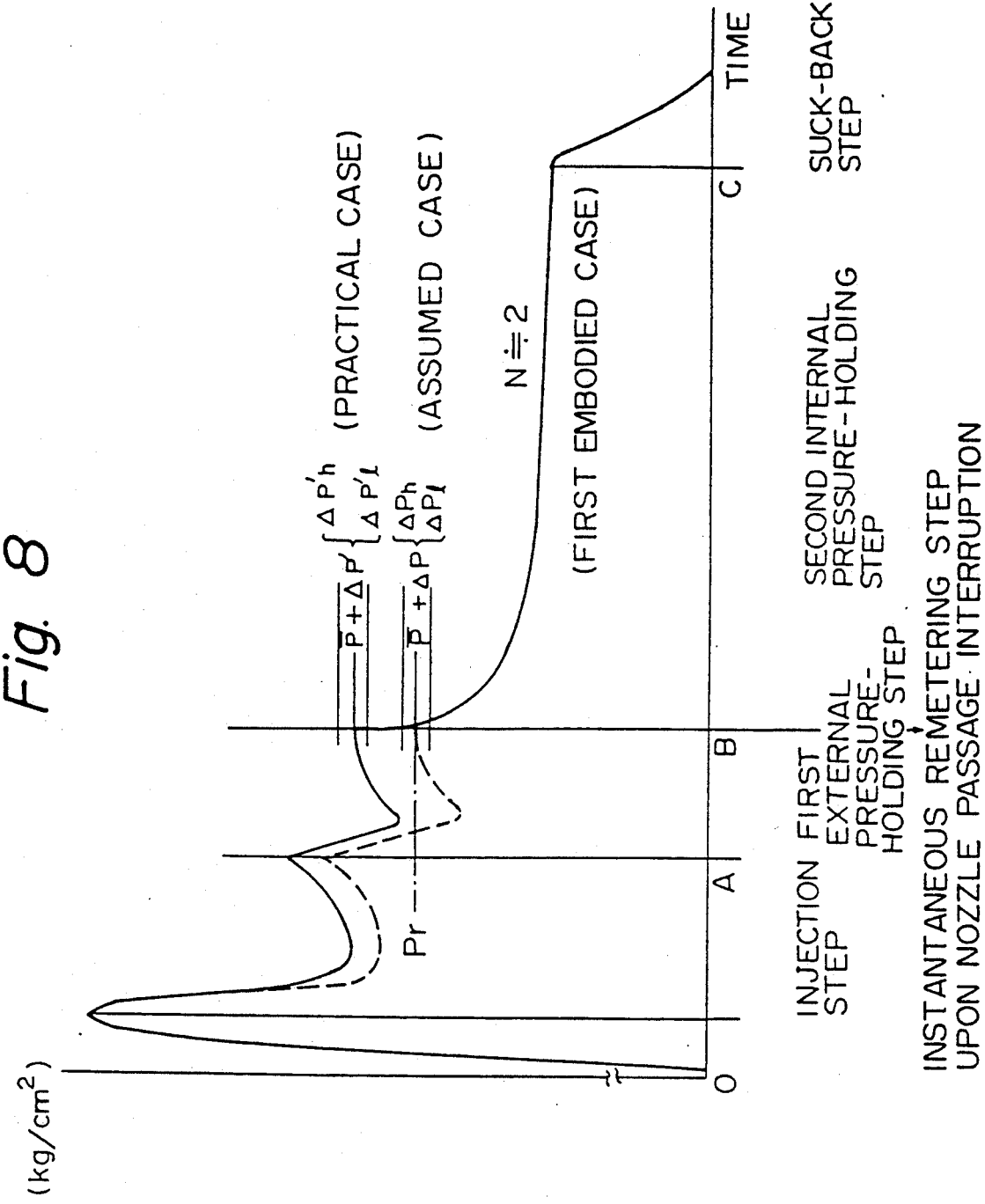
FIG. 8 is another practical diagram corresponding to FIG. 6 but showing an injection pressure, an external holding pressure and an internal holding pressure applied in one embodied process of the injection molding according to the present invention.

According to the above process where N=2, the external holding pressure and the internal holding pressure have the profiles as shown in FIG. 8.

In this case, the predetermined value $P_r$ of the internal pressure substantially corresponds to a desired average weight of plastic articles molded by the injection machine system with the mold cavity.

The average value $\bar{P}$ of the assumed initial internal pressure may be substantially equal to $(P_l + P_h)/2$.

Alternatively, $(\bar{P} - P_l)$ is a standard derivation $\sigma$.

Theoretically speaking, the instantaneous remetering step according to the present invention should result in production of a molded article having the same weight ($\bar{W}$) with no variation ($\Delta W = 0$), since P is regulated or adjusted to $\bar{P}$ in every shot, irrespective of any external pressure variation ($\Delta P$) occurring due to the injection plunger operated by the hydraulic piston-cylinder of the injection machine. However, in practice, such weight variation ($\Delta W$) occurs in every shot even if P is regulated to $P_r$ as such. This is true, although $\Delta W$ is considerably reduced to such an extent as that a super-precision article can be molded. This is due to various negatively influencing factors involved in the injection molding system. The factors include cooling of the mold arrangement 10, heating of the barrel 2 and the hollow extension including the cylindrical extension 20 of the injection machine 1 and the hot runner mold 13, and accuracy of the remetering. Incidentally, one of the factors affecting the equalization exerted due to the chamber may be the suck-back operation. This is because the weight variation is enhanced as a suck-back stroke is increased in a pressure-holding chamber system according to the present invention but with no remetering step applied.

With no remetering step being applied but the chamber volume ratio N being 2, thanks to an equalizing effect $P_2$ has an average of $\bar{P}_2$ with a variation $\Delta P_2$ which is definitely smaller than that of $\Delta P_1$ where $N = 1$. In this connection, it is advantageous in producing a high precision article to use an apparatus where N is increased more than 1, so long as a quality of a molded article is satisfactory.

If the chamber volume ratio N is less than 1, the chamber does not exert the equalizing effect to such an extent that a mold article has an average weight with substantially reduced variation compared with an assumed corresponding article molded with the same chamber but without effecting the nozzle passage interruption.

With respect to the quality of a molded article, the remetering means according to the present invention is harmless. This is because the remetering means or system of the present invention does not allow any part of the material supplied into the chamber X to stay for a longer period of time than the other parts, and the material is forced to enter into the cavity in the injection or shot order through the nozzle passage, while some part of the material is discharged out of the machine system in every shot.

In connection with this, it is noted that there may be assumed another pressure regulating system, wherein a remetering step is carried out without discharging any part of the materials supplied in the chamber out of the machine system, using a piston-cylinder device provided for regulating the pressure upon the nozzle passage interruption to a predetermined level with a predetermined piston stroke, and then fixing or maintaining the piston stroke as it is. In this assumed case, since the piston stroke is fixed after the initial pressure is regulated, the piston does not exert an external pressure on the material, and thus an internal pressure-holding step is carried out.

Therefore, the assumed remetering system may appear to be equivalent to that of the present invention. However, it is completely different from the present invention, since a part of the material is obliged to stay in a local passage branched from the nozzle passage in front of a free end of the piston, and thus it is excessively heated with the effect the material to be molded is damaged in quality. In turn according to the present invention, a corresponding part of the material in front of the piston free end is discharged immediately out of the system upon the nozzle passage interruption in every shot.

In the above assumed case, if the remaining material part is forced to return into the nozzle passage from the branched local passage after the second internal pressure holding step terminates in every shot, the damage of the product quality due to the excessively heated material part would be eliminated to some extent, although not completely.

However, the assumed case is critically defective, since the excess part of the material in each shot is not discharged out of the machine system but is held or kept in the machine system. This is because, in a long run under fixed operational conditions to which the machine is subjected, a part corresponding to the excess part of the material in each shot is accumulated in the entire machine system to thereby have the machine prevented from continuously operate in a stable or stationary manner. In this regard, the assumed case is inoperative. In turn, the remetering system of the present invention ensures the machine can operate under fixed desired operational conditions in a stable or stationary manner in a long shot run, while ensuring a weight variation of a molded article to be considerably reduced without any damage in quality of the article in every shot.

The discharged material stored in the tank 70 is equivalent to a "cold runner", which may be recovered for a starting material. In this regard, the discharged material involved in the remetering system according to the present invention may be called "a cold weight variation". According to experiments, the cold weight variation is continuously discharged from the discharged conduit 60, and it is confirmed that such cold weight variation is not risky even if it is discharged out of the machine system directly into the atmosphere without using the tank 70.

Thanks to the remetering system, the injection machine is no longer required to ensure a high primary metering performance exerted by a metering stroke of the injection screw plunger using sophisticated control equipment in order to reduce weight variation of a molded product. Even a poorly performing primary metering system in combination of a remetering system of according to the present invention causes weight variation to be considerably reduced, compared with a conventional primary metering system without any remetering system.

Further, the remetering system is advantageous in that it enables a set-up time, necessary to have an injection molding operation stabilized at every intermittent stop in a long run, to be shortened.

The remetering step according to the present invention is not limited to a regulation of the initial internal pressure in the closed chamber upon the nozzle passage interruption. It may be applied for an internal pressure of the material some time later than the time just after the nozzle passage interruption occurs. This also falls in the scope of the present invention.

According to the present invention, an injection machine per se to be employed may be not only a conventional one having hydraulic power equipment, but also a recently developed one having electric motor driving equipment or any other equivalent equipment for axially activating an injection plunger.

Figure 9:
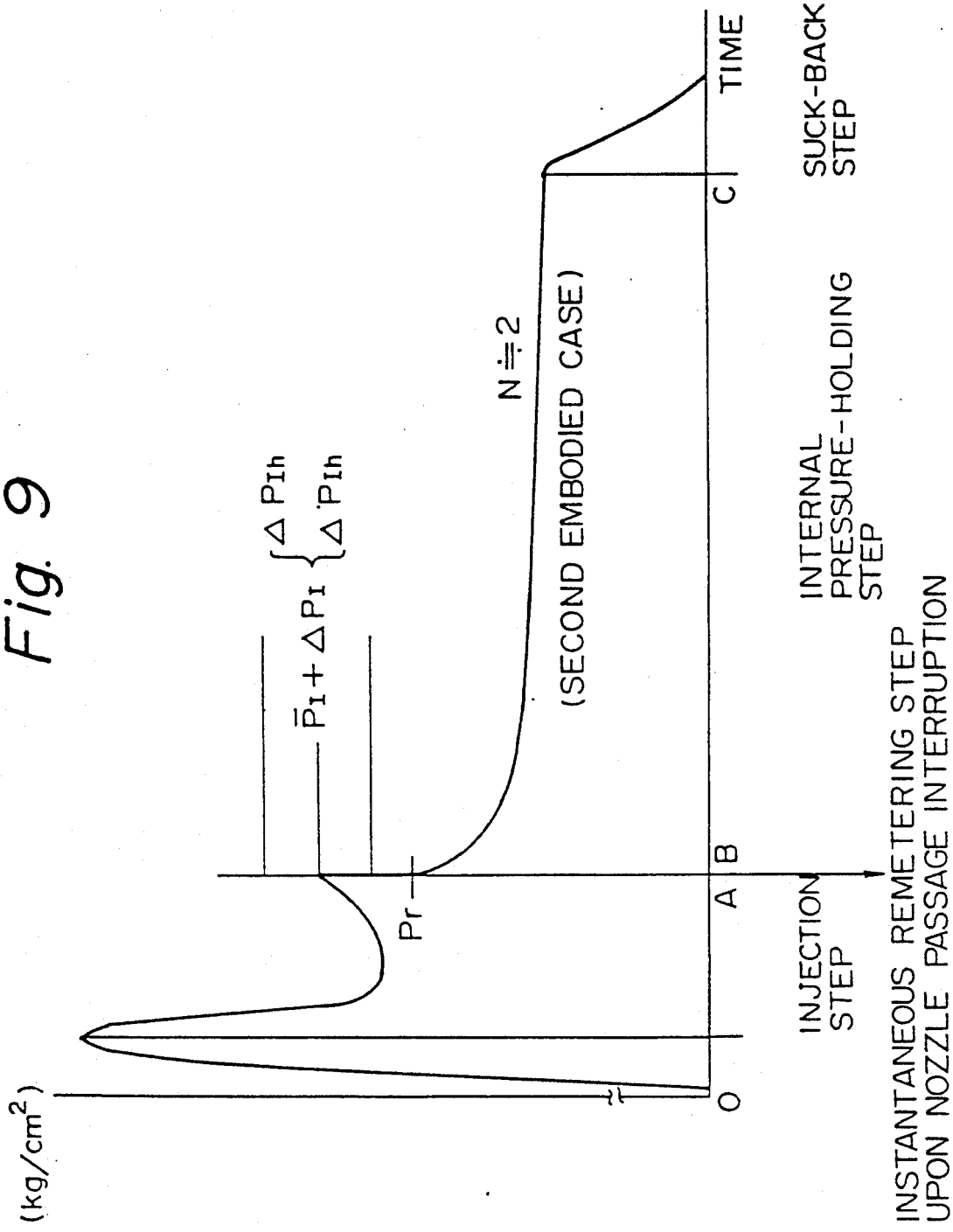
FIG. 9 is still another practical diagram corresponding to FIG. 6, but showing an injection pressure and an internal holding pressure applied in another embodied process of the injection molding according to the present invention.

According to another embodiment of the present invention using an apparatus as shown in FIG. 1, 2, 3, or 4 involving the remetering means, a process of injection molding with an instantaneous remetering step is carried out as shown in FIG. 9 (also by dotted lines in FIGS. 5 and 6). That is, the first external pressure-holding step (as shown in FIGS. 5 and 6) is omitted. An injection step is forced to terminate by the nozzle passage interruption, and an instantaneous remetering step is commenced with the effect that an initial internal pressure P equivalent to a final injection pressure is stepped down to a desired internal holding pressure value determined by the remetering piston-cylinder 50, which value corresponds to the above mentioned value $P_r$ (in FIG. 8). Upon the nozzle passage interruption following the injection step, an internal pressure-holding step is commenced with an internal pressure stepped down by the remetering system, with a definite excess part of the material compacted in a fixed closed space consisting of the pressure-holding chamber X and the cavity 10a being discharged out of the machine system.

The final injection pressure has a desired value $(\overline{P}_I)$ with a variation $(\Delta P_I)$ between values $P_{Ih}$ and $P_{Il}$ as shown in FIG. 9. The internal pressure $(P_r)$ is determined well below the lower limit $(P_{Il})$ of the final injection pressure. This means that the holding pressure is substantially constant in every shot, irrespective of the injection pressure variation.

An amount of the material compacted in the fixed closed space due to the injection of the material by the plunger 3 and the nozzle passage interruption by the valve means 40 appears to directly correspond to the fixed or constant regulated internal pressure $P_r$ of the material, in both first and second embodiments of FIGS. 8 and 9. However, in practice, there is a difference in the correspondence between both the embodiments. That is, the amount of the material compacted in the same fixed closed space according to each of the first and second embodiments is not constant but varies with a variation ratio relative to an average amount in every shot, and the amount variation ratio of the first embodiment is definitely larger than that of the second embodiment. It is considered that the difference in the amount variation ratio is effected mainly by a cooling rate of the mold arrangement. If the cooling rate is very low and thus a shot period of time is very long, such difference would be eliminated. A material is compacted in the fixed closed space and adjusted to the predetermined value in amount with an excess amount of the material being discharged out of the machine system immediately after the injection step according to the second embodiment of FIG. 9, while such material is adjusted after the first external pressure-holding step carried out subsequent to such injection step according to the first embodiment of FIG. 8. This difference in timing is considered to cause the difference in the amount variation ratio to occur.

In this regard, the second embodiment of FIG. 9 is more preferable in injection-molding a super precision article compared with the first embodiment of FIG. 8.

Further, the second embodiment is advantageous in that the injection machine is no longer required to have external pressure-holding equipment provided therein, and also a shot period of time can be shortened at the maximum by the time of the first external pressure-holding step involved in the first embodiment of FIG. 8, so long as a weight variation of a molded article is allowed to remain at a level of that of the first embodiment.

In turn, the inventor assumes that, with a relatively high fixed cooling rate for a mold arrangement, there may be a possibility of a chamber type process relying on the equalizing effect (with no remetering step) rendering a weight variation of a molded article to be reduced compared with the first embodied chamber type process (FIG. 8).

According to experiments with the present invention, cassette cases of GPPS as a precision product were injection-molded using apparatuses similar to that of FIG. 4 but with some modifications made, with the results regarding a variation of an article weight (W) in comparison with that of a practical case, as follow.

1. In a practical run using a pressure chamber type injection molding machine provided with modern or sophisticated metering equipment but without any remetering system, in combination with a mold arrangement having six cavities for the cassette cases, where N=1 (the chamber approximately corresponds to the six cavities in volume):

$\overline{x}$ = 87.448, at 100 shots in a stationary shot state
$\sigma$ = 0.130, 100 × $(\sigma/\overline{x})$ = 0.149
$R$ = 0.488, 100 × $(R/\overline{x})$ = 0.558

2. In an experimental run using a chamber type injection molding machine provided with old type metering equipment in combination with a mold arrangement having four cavities for the same cassette cases as the above one where N=2:

According to an experiment with a process of the present invention relying only on the equalizing effect without any remetering system and involving the first external pressure-holding step and the second internal pressure-holding step, where N =2, $\overline{x}$ = 52.480 g, at 100 shots in a stationary shot state
$\sigma$ = 0.0375 g, 100 × $(\sigma/\overline{x})$ = 0.715
$R$ = 0.172 g, 100 × $(R/\overline{x})$ = 0.328

3. In experimental runs using the same machine and mold arrangement as that of the experiment 2 above but with the remetering system as shown in FIG. 3, where N=2:

1) According to one experiment with the first process embodiment (FIG. 8) of the present invention involving the first external and second internal pressure-holding steps in combination with the instantaneous remetering step, $\overline{x}$ = 52.546, at 100 shots in a stationary shot state
$\sigma$ = 0.023, 100 × $(\sigma/\overline{x})$ = 0.043
$R$ = 0.115, 100 × $(R/\overline{x})$ = 0.219

A production rate (i.e. a shot period of time) is 12.6 sec. for four cassette cases.

2) According to another experiment with the second process embodiment (FIG. 9) of the present invention involving the internal pressure-holding step in combination with the instantaneous remetering step, but with no external pressure-holding step, $\bar{x} = 52.558$, at 100 shots in a stationary state
$\sigma = 0.0204$, $100 \times (\sigma/\bar{x}) = 0.039$
$R = 0.094$, $100 \times (R/\bar{x}) = \underline{0.179}$ A production rate is 9.6 sec. for four cassette cases.

As being apparent form the above results, the remetering system of the present invention is very advantageous in producing a super precision molded article, irrespective of the two kinds of embodiments of FIGS. 8 and 9, with the second embodiment being more advantageous than the first embodiment in both the article weight variation and productivity. This is true although the above comparative and experimental processes with no remetering step, running in practice where N=1 and in experiment where N=2, respectively, are very advantageous in injection-molding a precision article with a high productivity, compared with a conventional non-pressure-holding chamber type process.

Further, in comparison of the practical run of item 1 above with the experimental run of item 2 above it is appreciated that the experimental process where N=2 is advantageous in reducing the weight variation more than the practical process where N=1, due to the equalizing effect.

I claim:

1. A process of injection molding using an injection machine having a body provided with an injection plunger therein and a hollow extension therefrom including a nozzle and forming a nozzle passage, and a mold arrangement defining a cavity having a gate, the mold arrangement incorporated in the machine to communicate between the interior of the machine body and the mold cavity via the nozzle passage, the process comprising steps of: having a plastic material, in each of a series of shot cycles, plasticized and metered while being heated as the machine body is being heated; having the hot plasticized material injected under pressure toward the mold cavity through the nozzle passage; having a portion of the hot injected material being held within the entire mold cavity under pressure while the mold arrangement is being cooled to thereby provide and freeze a molded article therein; and having the frozen molded article removed from the mold cavity after the mold arrangement is opened, wherein said nozzle passage is interrupted midway therealong from communication between the interior of the machine body and the mold cavity, using a valve means incorporated with said nozzle passage, after said injection step, and upon said nozzle passage interruption, said plasticizing and metering step is carried out by the injection machine for a next shot cycle, said material pressure-holding step comprising a step using said valve means for having an internal holding pressure on only a forward portion of the entire injected material separated due to said nozzle passage interruption, exerted by the forward material portion itself, which is compacted in a fixed closed space comprising a combination of the mold cavity and a forward part of the nozzle passage forming an internal pressure-holding chamber defined by the hollow extension and the valve means between the valve means and the gate, characterized in that the hot material compacted in said fixed closed space in each shot is controllably adjusted to a predetermined value in amount before termination of said internal pressure-holding step by controllably opening a portion of the fixed closed space to discharge an excess part of the compacted material out of the machine system when the hot compacted material exceeds the predetermined value and until the hot compacted material equals the predetermined value.

2. A process of injection molding according to claim 1, wherein an additional metering or remetering step for effecting said adjustment in amount of the compacted material is carried out, upon or after said nozzle passage interruption, by regulating said internal pressure of the compacted material to a predetermined value $P_r$, if the internal pressure is over said value, with said excess part of the compacted hot material being discharged out of the injection machine system.

3. A process of injection molding according to claim 2, wherein said material pressure-holding step further comprises a first step, followed by said internal pressure-holding step as a second step, for exerting an external holding pressure on the entire injected material, using the injection plunger of the injection machine.

4. A process of injection molding according to claim 3, wherein: said internal holding pressure is stepped down to said predetermined value from an initial one equivalent to a final external holding pressure exerted when said nozzle passage interruption occurs; said predetermined value $P_r$ is determined, in the long run, to be equivalent to an average value of initial internal pressures in the closed space exerted in an assumed or test long run with the injection machine system with said local passage being closed off from the exterior in every shot, said assumed initial internal pressures P varying in a range between a lower limit $P_l$ and a higher limit $P_h$; the injection machine is operated in practice so as to have a practical initial internal pressure $P'$ in the second pressure-holding step substantially vary with an average value equivalent to $P_h$ or higher, between an upper limit and a lower limit equivalent to $\bar{P}$ or higher, while the other operational conditions substantially remain as they are in the assumed run.

5. A process of injection molding according to claim 4, wherein said predetermined value of the initial internal pressure substantially corresponds to a desired average weight of plastic products molded by the injection machine system with said mold cavity.

6. A process of injection molding according to claim 5, wherein said the average value $\bar{P}$ of the initial internal pressure is substantially equal to $(P_l + P_h)/2$.

7. A process of injection molding according to claim 6, wherein $(\bar{P} - P_l)$ is a standard derivation $\sigma$.

8. A process of injection molding according to claim 3, wherein said first external pressure-holding step is carried out under non-stepped operational conditions to have the plunger exert a non-stepped external pressure on the injected material.

9. A process of injection molding according to claim 8, wherein said injecting step is carried out under non-stepped operational conditions to fill the mold cavity with the material with the plunger exerting a non-stepped external pressure thereon, said injecting external pressure and said material holding external pressure in combination forming a stepped external pressure exerted by the injection plunger under stepped operational conditions.

10. A process of injection molding according to claim 9, wherein said changed operational conditions are those for primarily metering a specific amount of the plasticized material to be injected and for having the plunger exert said external pressures in both injection and first material pressure-holding steps.

11. A process of injection molding according to claim 2, wherein said material pressure-holding step substantially consists of said internal pressure-holding step switched from said injection step by said nozzle passage interruption with said predetermined value $P_r$ in pressure being an internal pressure value stepped down from that of an initial internal pressure value which is equivalent to a final injection pressure exerted by the plunger.

12. A process of injection molding according to claim 11, wherein said final injection pressure is of a desired value varying with a lower limit, which is definitely higher than said predetermined value $P_r$ in internal pressure.

13. A process of injection molding according to claim 11, wherein said pressure regulation is effected using a combination of a local passage leading to the exterior of the injection machine system and provided to form a branch from the nozzle passage at said valve means for discharging said excess part of the compacted material therethrough, and an additional valve means incorporated into the local passage and provided for: opening said local passage to said nozzle passage upon said nozzle passage interruption; opening the local passage to the exterior when the internal pressure is over said value; and closing the local passage off from the exterior when the internal pressure is reduced to said predetermined value.

14. A process of injection molding according to claim 3, wherein said pressure regulation is effected using a combination of a local passage leading to the exterior of the injection machine system and provided to form a branch from the nozzle passage at said valve means for discharging said excess part of the compacted material therethrough, and an additional valve means incorporated into the local passage and provided for: opening said local passage to said nozzle passage upon said nozzle passage interruption; opening the local passage to the exterior when the internal pressure is over said value; and closing the local passage off from the exterior when the internal pressure is reduced to said predetermined value.

15. A process of injection molding according to claim 14, wherein a hot runner mold is used to form a forward part of said nozzle passage.

16. A process of injection molding according to claim 15, further comprising a step of sucking back the hot material remaining in said closed space due to enlargement of volume thereof, before the mold arrangement is opened for removing the molded article but while said nozzle passage interruption is maintained, to thereby release the hot material from the excessive packing.

17. A process of injection molding according to claim 16, wherein a forward end of the hot material remaining in the nozzle passage following the molded article is frozen by cooling the mold at the gate, said frozen or cold forward material end being melted by instantaneous heat being temporarily applied after said sucking back step is completed but just before a next shot or injection.

18. A process of injection molding according to claim 17, wherein said nozzle passage interruption is released to have the mold cavity communicate with the interior of the machine body for the next shot, before said cold forward material end melts.

19. A process of injection molding according to claim 18, wherein said first external pressure-holding step is forced to terminate upon the external holding pressure becoming substantially stationary.

20. A process of injection molding using an injection machine having a body provided with an injection plunger therein and a hollow extension therefrom forming a nozzle passage and a mold arrangement defining a cavity having a gate, the mold arrangement incorporated in the machine to communicate between the interior of the machine body and the mold cavity via the nozzle passage, the process comprising steps of: having a plastic material, in every shot cycle, plasticized and metered while being heated as the machine body is being heated; having the hot plasticized material injected under pressure for the mold cavity through the nozzle passage; having the hot injected material held at least partially within the entire mold cavity under pressure while the mold arrangement is being cooled to thereby provide and freeze a molded article therein; and having the frozen molded article removed from the mold cavity after the mold arrangement is opened, wherein said nozzle passage is interrupted midway therealong from communication between the interior of the machine body and the mold cavity, using a valve means incorporated with said nozzle passage, after said injection step but while said material pressure-holding step is being carried out, and upon said nozzle passage interruption, said plasticizing and metering step is carried out by the injection machine for a next shot or injection, said material pressure-holding step being carried out by: first using the injection machine per se operated with the injection plunger to exert a first holding pressure on the entire injected material; second using said valve means for exerting a second holding pressure on only a forward portion of the entire injected material separated due to said nozzle passage interruption, said first holding pressure being an external pressure executed by the injection plunger subsequent to an injecting pressure, and said second holding pressure being an internal pressure exerted, upon said nozzle passage interruption, by the forward material portion per se, which is compacted in a fixed closed space consisting of a combination of the mold cavity and a forward part of the nozzle passage forming an internal pressure-holding chamber defined by the hollow extension and said valve means between said valve means and said gate, characterized in that an internal spatial volume of the pressure-holding chamber is approximately that of the cavity or greater to exert a definite equalizing effect on the injected material so that a molded article has an average weight with substantially reduced variation, in comparison with an assumed corresponding article molded with the same chamber but without effecting said nozzle passage interruption.

21. A process of injection molding according to claim 20, wherein said injecting step is carried out under non-stepped operational conditions to fill the mold cavity with the material with the plunger exerting a non-stepped external pressure thereon, said injecting external pressure and said material holding external pressure in combination forming a stepped external pressure exerted by the injection plunger under stepped operational conditions.

22. A process of injection molding according to claim 21, wherein the first external pressure-holding step is forced to terminate upon the external pressure becoming substantially stationary and then said nozzle passage interruption is effected for said second internal pressure-holding step.

23. An apparatus for injection molding incorporated with a mold arrangement having mold halves defining at least one cavity having at least one gate, comprising an injection machine having a body forming a barrel and a hydraulic piston-cylinder or an electrical plunger driving means provided with an injection plunger in said barrel, and a hollow extension therefrom including a nozzle and forming a nozzle passage communicating between the interior of the machine body and the mold cavity, the machine provided for having a plastic material plasticized and metered within the machine body, while the machine body and said hollow extension are being heated, and having the hot plasticized material injection for the mold cavity through the nozzle passage and having a portion of the injected material held within the entire mold cavity under pressure, said mold halves being provided with means for cooling the mold arrangement, the apparatus further comprising a pressure-holding chamber defined by said hollow extension and a valve means incorporated therein between said valve means and said gate, said valve means being provided for interrupting the nozzle passage midway therealong from communicating between the interior of the machine body and the mold cavity, said pressure-holding chamber and said mold arrangement in combination providing a fixed closed space of a combination of the mold cavity and said chamber communicating therewith with a forward portion of the entire injected material separated due to said nozzle passage interruption being compacted therein to thereby have the compacted material exert an internal pressure to urge itself against the mold cavity, characterized in that the said hollow extension forms a local passage branched from said nozzle passage and leading to the exterior of the injection machine system with second and third valve means incorporated into said local passage, said second valve means being provided for controllably opening an inlet of the local passage when the first mentioned valve means is in a closed position for closing said inlet when said first valve means is in an opened position, said third valve means being provided for opening said local passage to the exterior of the system when an internal pressure of the compacted material is over a predetermined value and for closing said local passage off from the exterior when the internal pressure is less than said predetermined value, wherein the internal pressure is regulated to said predetermined value upon said nozzle passage interruption when the internal pressure is over said predetermined value, with a part of the compacted material being discharged out of the system.

24. An apparatus for injection molding according to claim 23, wherein said first valve means comprises a circular rod rotatably disposed in said hollow extension, said valve rod having a through-hole forming a section of said nozzle passage when said first valve means is in an opened position, said second valve means comprises a groove formed at a surface portion of said valve rod which faces said nozzle when said first valve means is in a closed position, said groove defining with said hollow extension a forward section of said local passage open to said third valve means.

25. An apparatus for injection molding according to claim 24, wherein said local passage comprises said forward section, a rear section and said third valve means therebetween, said third valve means comprising a piston-cylinder incorporated with an elastic or resilient means for urging said piston against the compacted material under said predetermined value of pressure, said forward local passage section having an outlet open to a forward end of said cylinder, said rear local passage section having an inlet open to said cylinder, said inlet of said rear local passage section being closed by said piston when said third valve means is in the closed position.

26. An apparatus for injection molding according to claim 25, wherein said hollow extension has a through-hole crossing said nozzle passage, which through-hole is constricted to form a larger diameter forward portion and a smaller diameter rear portion with a shoulder formed therebetween, said valve rod being rotatably disposed in said larger diameter hole portion and abutting against said shoulder, said smaller diameter hole portion defining said cylinder, said groove of said valve rod and said larger diameter hole portion in combination forming said forward section of said local passage, said piston abutting against a rear end of said valve rod when the internal pressure of the compacted material is reduced from said predetermined value.

27. An apparatus for injection molding according to claim 23, wherein a means for regulating a pressure exerted by said third valve means on the compacted material to a predetermined value is provided.

28. An apparatus for injection molding according to claim 27, wherein said hollow extension is provided with a means for heating a possible excess part of said compacted material which part is to be discharged through said local passage out of the system, and the apparatus is incorporated with a tank leading to said local rear passage section where the discharged material is stored.

29. An apparatus for injection molding according to claim 28, wherein said cylinder has a rear portion forming a larger diameter chamber, and said piston has a flange at a rear portion thereof, said flange portion being received in said larger diameter chamber, said larger diameter chamber having a threaded hole at a rear end thereof, a threaded bolt-like rod having a flange received in said larger diameter chamber, and a coil spring located between and abutting against both said flanges to form said resilient means being provided so that a pressure exerted against the compacted material by said resilient means is regulated to a predetermined value by rotating said bolt-like rod relative to said cylinder.

30. An apparatus for injection molding according to claim 29, wherein said first valve means comprises a pulse motor for rotating said valve rod relative to said hollow extension to thereby change the valve position from the closed position to the opened position or vice-versa.

31. An apparatus for injection molding according to claim 30, wherein said through-hole of said valve rod has an axis perpendicular to an axis of said through-hole of said first valve means where said valve rod is disposed, and said axis of said valve rod hole is angled relative to said groove of said valve rod by 90° or less.

32. An apparatus for injection molding according to claim 31, wherein an internal spatial volume of said pressure-holding chamber is large enough relative to that of said mold cavity to exert an equalizing effect on the injected material so that a molded article has an average weight with reduced variation compared with an assumed corresponding article molded without effecting said nozzle passage interruption in a long run, but is small enough to prevent the hot material accumulated in said chamber from being damaged due to continued heating while remaining in said chamber.

33. An apparatus for injection molding according to claim 32, wherein said internal volume of said pressure-holding chamber is approximately that of said mold cavity or greater.

34. An apparatus for injection molding according to claim 33, wherein said hollow extension is divided into forward and rear parts, said rear part forming said nozzle at a forward end thereof and being provided with said first valve means upstream of said nozzle, said injection machine being provided with a means for having said machine body with said rear part connected thereto move axially relative to said forward part, said forward part having a rear cylinder section and a forward section connected to said mold arrangement, said nozzle forming a bore piston section axially movably disposed in said rear cylinder section, said bore piston section and said cylinder section in combination forming means for axially abutting them against each other to stop an axial forward movement of said nozzle at a fixed relative position and to prevent leakage of the material at said nozzle, by a sealing action resulting from the abutment, wherein a combination of said cylinder section and said bored piston section causes the nozzle passage to axially expand the volume thereof by a rearward movement of the injection machine relative to said mold arrangement, while the nozzle passage interruption is maintained but before the mold article is removed from the mold cavity, with the effect that the hot material remaining in said closed space is sucked back so that it is released from being pressurized and compacted.

35. An apparatus for injection molding according to claim 34, wherein said axially abutting and sealing means comprises a stopper provided at said bore piston section or said nozzle for allowing an axial position of said stopper relative to said machine body to change in cooperation with said rear part of said hollow extension to thereby have said volume of said pressure-holding chamber adjusted to a desired level.

36. An apparatus for injection molding according to claim 35, wherein said nozzle is provided so as to be stationary relative to said machine body, and said stopper is comprised of an internally threaded ring member, while said nozzle is partially threaded externally, said nozzle being engaged with said ring stopper by being screwed thereinto.

37. An apparatus for injection molding according to claim 35, wherein said stopper is fixed to said nozzle, while said rear hollow extension part is divided into a rear local part which is partially threaded internally, and said nozzle forming a forward local part which is partially externally threaded, said nozzle being engaged with said rear local part by being screwed thereinto.

38. An apparatus for injection molding according to claim 36, wherein a hot runner mold integrated with a manifold is provided to form said forward section of said forward hollow extension part, and said hot runner mold is provided with means for instantaneously and temporarily heating the material at said gate of said mold cavity when the mold arrangement is closed for a next injection operation while the mold arrangement is being cooled, with the effect that the mold cavity is opened to the nozzle passage with a forward frozen part of the material in said gate being melted.

39. An apparatus for injection molding according to claim 37, wherein a hot runner mold integrated with a manifold is provided to form said forward section of said forward hollow extension part, and said hot runner mold is provided with means for instantaneously and temporarily heating the material at said gate of said mold cavity when the mold arrangement is closed for a next injection operation while the mold arrangement is being cooled, with the effect that the mold cavity is opened to the nozzle passage with a forward frozen part of the material in said gate being melted.

40. An apparatus for injection molding incorporated with a mold arrangement having mold halves defining at least one cavity having at least one gate, comprising an injection machine having a body forming a barrel and a hydraulic piston-cylinder or an electrical plunger driving means provided with an injection plunger in said barrel, and a hollow extension therefrom including a nozzle and forming a nozzle passage communicating between the interior of the machine body and the mold cavity, the machine provided for having a plastic material plasticized and metered within the machine body, while the machine body and said hollow extension are being heated, and having the hot plasticized material injected for the mold cavity through the nozzle passage and having a portion of the injected material held within the entire mold cavity under pressure, said mold halves being provided with means for cooling the mold arrangement, the apparatus further comprising a pressure-holding chamber defined by said hollow extension and a valve means incorporated therein between said valve means and said gate, said valve means being provided for interrupting the nozzle passage midway therealong from communicating between the interior of the machine body and the mold cavity, said pressure-holding chamber and said mold arrangement in combination providing a fixed closed space of a combination of the mold cavity and said chamber communicating therewith with a forward portion of the entire injected material separated due to said nozzle passage interruption being compacted therein to thereby have the compacted material exert an internal pressure to urge itself against the mold cavity, characterized in that an internal spatial volume of the pressure-holding chamber is approximately that of said cavity or greater.

41. An apparatus for injection molding according to claim 40, wherein said hollow extension forms a cylindrical means, including said nozzle, for axially changing and fixing said pressure-holding chamber to a predetermined size in volume.

42. An apparatus for injection molding according to claim 41, wherein said hollow extension is divided into forward and rear parts, said rear part forming said nozzle at a forward end thereof and being provided with said first valve means upstream of said nozzle, said injection machine being provided with a means for having said machine body with said rear part connected thereto move axially relative to said forward part, said forward part having a rear cylinder section and a forward section connected to said mold arrangement, said nozzle forming a bore piston section axially movably disposed in said rear cylinder section, said bore piston section and said cylinder section in combination forming means for axially abutting them against each other to stop an axial forward movement of said nozzle at a fixed relative position and to prevent leakage of the material at said nozzle, by a sealing action resulting from the abutment, wherein a combination of said cylinder section and said bored piston section causes the nozzle passage to axially expand the volume thereof by a rearward movement of the injection machine relative to said mold arrangement, while the nozzle passage interruption is maintained but before the mold article is removed from the mold cavity, with the effect that the hot material remaining in said closed space is sucked back so that it is released from being pressurized and compacted.

43. An apparatus for injection molding according to claim 42, wherein said axially abutting and sealing means comprises a stopper provided at said bore piston section or said nozzle for allowing an axial position of said stopper relative to said machine body to change in cooperation with said rear part of said hollow extension to thereby have said volume of said pressure-holding chamber adjusted to a desired level.

44. An apparatus for injection molding according to claim 43, wherein said nozzle is provided so as to be stationary relative to said machine body, and said stopper is comprised of an internally threaded ring member, while said nozzle is partially threaded externally, said nozzle being engaged with said ring stopper by being screwed thereinto.

45. An apparatus for injection molding according to claim 44, wherein said stopper is fixed to said nozzle, while said rear hollow extension part is divided into a rear local part which is partially threaded internally, and said nozzle forming a forward local part which is partially externally threaded, said nozzle being engaged with said rear local part by being screwed thereinto.

46. An apparatus for injection molding according to claim 45, wherein a hot runner mold integrated with a manifold is provided to form said forward section of said forward hollow extension part, and said hot runner mold is provided with means for instantaneously and temporarily heating the material at said gate of said mold cavity when the mold arrangement is closed for a next injection operation while the mold arrangement is being cooled, with the effect that the mold cavity is opened to the nozzle passage with a forward frozen part of the material in said gate being melted.

47. An apparatus for injection molding according to claim 46, wherein a hot runner mold integrated with a manifold is provided to form said forward section of said forward hollow extension part, and said hot runner mold is provided with means for instantaneously and temporarily heating the material at said gate of said mold cavity when the mold arrangement is closed for a next injection operation while the mold arrangement is being cooled, with the effect that the mold cavity is opened to the nozzle passage with a forward frozen part of the material in said gate being melted.

* * * * *

UNITED STATES PATENT AND TRADEMARK OFFICE
CERTIFICATE OF CORRECTION

PATENT NO. : 5,248,460
DATED : September 28, 1993
INVENTOR(S) : Shigeru TSUTSUMI It is certified that error appears in the above-indentified patent and that said Letters Patent is hereby corrected as shown below:

Column 3, line 40, change "detailed" to --details--.

Column 5, line 46, change "ber is" to --ber, the chamber is--.

Column 6, line 57, change "such-back" to --sucking-back--.

Column 8, line 16, change "an" to --a--.

Column 11, line 6, change "an" to --and--.

Column 12, line 39, between "outlet" and "when" insert --hole 30' a,--.

Column 12, line 40, between "outlet" and "is" insert --hole 30' a,--.

Column 15, line 33, after "effect" insert a comma.

Column 16, line 7, between "effect" and "the" insert --that--.

UNITED STATES PATENT AND TRADEMARK OFFICE
CERTIFICATE OF CORRECTION

PATENT NO. : 5,248,460
DATED : September 28, 1993
INVENTOR(S) : Shigeru TSUTSUMI It is certified that error appears in the above-indentified patent and that said Letters Patent is hereby corrected as shown below:

Column 16, line 28, change "operate" to --operating--.

Column 16, line 55, change "of" to --with--.

Column 16, line 56, delete "of" at beginning of line.

Column 17, line 52, changed "effected" to --affected--.

Column 19, line 9, change "As being apparent form" to --As is apparent from--.

Column 22, line 56, change "effecting" to --affecting--

Column 25, lines 4 and 5, change "effecting" to --affecting--.

Signed and Sealed this

Twelfth Day of July, 1994

Attest:

BRUCE LEHMAN

Attesting Officer

Commissioner of Patents and Trademarks